(12) United States Patent
Sundar et al.

(10) Patent No.: US 12,373,967 B2
(45) Date of Patent: Jul. 29, 2025

(54) SYSTEMS, METHODS, AND MEDIA FOR ESTIMATING DEPTHS IN A SCENE USING SINGLE-PHOTON DETECTORS AND BINARY STRUCTURED LIGHT PATTERNS

(71) Applicant: WISCONSIN ALUMNI RESEARCH FOUNDATION, Madison, WI (US)

(72) Inventors: Varun Sundar, Madison, WI (US); Mohit Gupta, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 236 days.

(21) Appl. No.: 17/807,656

(22) Filed: Jun. 17, 2022

(65) Prior Publication Data

US 2023/0410333 A1   Dec. 21, 2023

(51) Int. Cl.
  *G06T 7/50*   (2017.01)
(52) U.S. Cl.
  CPC ...... *G06T 7/50* (2017.01); *G06T 2207/10028* (2013.01); *G06T 2207/30204* (2013.01)
(58) Field of Classification Search
  CPC ............ G06T 7/50; G06T 2207/10028; G06T 2207/30204; G06T 7/55; G06T 7/521; G06T 2207/10016; G06T 2207/20076
  See application file for complete search history.

(56) References Cited

PUBLICATIONS

Sundar ( Single-Photon Structured Light. arXiv e-prints. Apr. 2022:arXiv-2204). (Year: 2022).*

An et al., Pixel-wise absolute phase unwrapping using geometric constraints of structured light system. Opt. Express, 24(16):18445-18459, Aug. 2016.

Brandli et al., Adaptive pulsed laser line extraction for terrain reconstruction using a dynamic vision sensor. Frontiers in Neuroscience, 7:275, 2014.

Couture et al., "Unstructured light scanning to overcome interreflections," 2011 International Conference on Computer Vision, 2011, pp. 1895-1902, doi: 10.1109/ICCV.2011.6126458.

Fanello et al., Hyperdepth: Learning depth from structured light without matching. In Proceedings of the IEEE Conference on Computer Vision and Pattern Recognition (CVPR), Jun. 2016.

(Continued)

*Primary Examiner* — Wassim Mahrouka
(74) *Attorney, Agent, or Firm* — Andrus Intellectual Property Law, LLP

(57) ABSTRACT

In accordance with some embodiments, systems, methods, and media for estimating depths in a scene using single-photon detectors and binary structured light patterns are provided. In some embodiments, a system comprises: a light source; an image sensor comprising an array including single-photon detectors; a processor programmed to: cause the light source to emit a sequence of n binary light patterns toward the scene, each comprising at least L columns, each of the patterns has a minimum stripe width of 8 columns; and $n > \log_2(L)$; cause, for each of the n binary light patterns, the image sensor to capture a binary image of the scene, the binary image comprises a binary value for each of single-photon detectors such that each of the single-photon detectors generates a set of binary values; and estimate, for each single-photon detector, a depth value based on the set of binary values.

20 Claims, 18 Drawing Sheets

(56) References Cited

PUBLICATIONS

Huang et al., Highspeed structured light based 3d scanning using an event camera. Opt. Express, 29(22):35864-35876, Oct. 2021.

Hyun et al., Highspeed and high-accuracy 3d surface measurement using a mechanical projector. Opt. Express, 26 (2):1474-1487, Jan. 2018.

Kemao, Qian . Two-dimensional windowed fourier transform for fringe pattern analysis: Principles, applications and implementations. Optics and Lasers in Engineering, 45(2):304-317, 2007. Phase Measurement Techniques and their applications.

Kemao, Qian . Windowed fourier transform for fringe pattern analysis. Appl. Opt., 43(13):2695-2702, May 2004.

Keselman et al., Intel realsense stereoscopic depth cameras. In Proceedings of the IEEE Conference on Computer Vision and Pattern Recognition (CVPR) Workshops, Jul. 2017.

Koppal et al., Exploiting dlp illumination dithering for reconstruction and photography of high-speed scenes. International journal of computer vision, 96(1):125-144, 2012.

Lei et al., Flexible 3-d shape measurement using projector defocusing. Opt. Lett., 34(20):3080-3082, Oct. 2009.

Leroux et al., Event-based structured light for depth reconstruction using frequency tagged light patterns. arXiv preprint arXiv:1811.10771, 2018.

Mangalore et al., Neuromorphic fringe projection profilometry. IEEE Signal Processing Letters, 27:1510-1514, 2020.

Martel et al., An active approach to solving the stereo matching problem using event-based sensors. In 2018 IEEE International Symposium on Circuits and Systems (ISCAS), pp. 1-5. IEEE, 2018.

Matsuda et al., MC3D: Motion Contrast 3D Scanning. In 2015 IEEE International Conference on Computational Photography (ICCP), 2015.

Su et al., Automated phase-measuring profilometry using defocused projection of a ronchi grating. Optics Communications, 94(6):561-573, 1992.

Zhang et al., Superfast phase-shifting method for 3-d shape measurement. Optics express, 18(9):9684-9689, 2010.

Zhang, Microsoft kinect sensor and its effect. IEEE MultiMedia, 19:4-12, Apr. 2012.

Zheng et al., Phase error analysis and compensation for phase shifting profilometry with projector defocusing. Applied Optics, 55(21):5721, Jul. 2016.

* cited by examiner

| | $P_{flip,dark}$ | $P_{flip,bright}$ | Pr{error} |
|---|---|---|---|
| dark room | 0.021 | 0.22 | 0.72 |
| indoor lamp | 0.23 | 0.19 | 0.9 |
| spot lamp | 0.75 | 0.06 | 0.99 |

Bit-flip probabilities

Binary frames captured by Single-Photon Camera (b) Hybrid $BCH(31,11,11)$ codes

SYSTEMS, METHODS, AND MEDIA FOR ESTIMATING DEPTHS IN A SCENE USING SINGLE-PHOTON DETECTORS AND BINARY STRUCTURED LIGHT PATTERNS

STATEMENT REGARDING FEDERALLY SPONSORED RESEARCH

This invention was made with government support under 1943149 awarded by the National Science Foundation. The government has certain rights in the invention.

CROSS-REFERENCE TO RELATED APPLICATIONS

N/A

BACKGROUND

Structured light (SL) is a 3D imaging technique used in various applications, such as industrial automation, augmented reality, and autonomous navigation (e.g., for robotics, vehicles, etc.). Various SL techniques have been developed that can achieve various degrees of accuracy, and that require various amounts of time and computational resources to carry out. For example, SL systems that use laser scanning SL techniques can recover 3D shape (e.g., the distance from the system to various points on the object) of one or more objects in a scene accurately (e.g., in the range of 10-100 microns in accuracy), but such systems typically require a large acquisition time. This limits the usefulness of such systems in many applications that require high precision and that also have limited acquisition time budgets, such as industrial inspection applications.

Accordingly, new systems, methods, and media for estimating depths in a scene using single-photon detectors and binary structured light patterns are desirable.

SUMMARY

In accordance with some embodiments of the disclosed subject matter, systems, methods, and media for estimating depths in a scene using single-photon detectors and binary structured light patterns are provided.

In accordance with some embodiments of the disclosed subject matter, a system for estimating depths in a scene is provided, the system comprising: a light source; an image sensor comprising an array including a plurality of single-photon detectors; at least one hardware processor that is programmed to: cause the light source to emit a sequence of n binary light patterns toward the scene, each of the n binary light patterns comprising at least L columns, wherein each of the n binary light patterns has a minimum stripe width of 8 columns; and wherein $n>\log_2(L)$; cause, for each of the n binary light patterns, the image sensor to capture a binary image of the scene, wherein the binary image comprises a binary value for each of the plurality of single-photon detectors indicative of whether a photon was detected such that each of the plurality of single-photon detectors generates a set of binary values corresponding to the sequence of n binary light patterns; and estimate, for each of the plurality of single-photon detectors, a depth value based on the set of binary values generated by that single-photon detector.

In some embodiments, wherein, for each of the at least L columns, a first subset of the n binary light patterns corresponds to at least a first portion of a unique codeword, and wherein, for each of the at least L columns, a second subset of the n binary light patterns encodes at least the first portion of the unique codeword associated with that column, the second subset of columns including more columns than the first subset.

In some embodiments, wherein the second subset of the n binary light patterns is a Bose-Chaudhuri-Hocquenghem (BCH) encoding of the first subset of the n binary light patterns.

In some embodiments, wherein the first subset of the n binary light patterns comprises long Gray codes, and the second subset of the n binary light patterns comprises multiple repetitions of the long Gray codes.

In some embodiments, wherein, for each of the at least L columns, a third subset of the n binary light patterns corresponds to a second portion of the unique codeword, the third subset encodes the second portion of the unique codeword in a phase of a binary stripe pattern.

In some embodiments, wherein the light source comprises a digital micromirror device (DMD) comprising an array of micromirrors.

In some embodiments, wherein each of the plurality of single-photon detectors comprises a single-photon avalanche diode (SPAD).

In some embodiments, wherein $n \geq 63$.

In accordance with some embodiments of the disclosed subject matter, a method for estimating depths in a scene is provided, the method comprising: causing a light source to emit a sequence of n binary light patterns toward the scene, each of the n binary light patterns comprising at least L columns, wherein each of the n binary light patterns has a minimum stripe width of 8 columns; and wherein $n>\log_2(L)$; causing, for each of then binary light patterns, an image sensor to capture a binary image of the scene, wherein the image sensor comprises an array including a plurality of single-photon detectors, and wherein the binary image comprises a binary value for each of the plurality of single-photon detectors indicative of whether a photon was detected such that each of the plurality of single-photon detectors generates a set of binary values corresponding to the sequence of n binary light patterns; and estimating, for each of the plurality of single-photon detectors, a depth value based on the set of binary values generated by that single-photon detector.

In accordance with some embodiments of the disclosed subject matter, a non-transitory computer readable medium containing computer executable instructions that, when executed by a processor, cause the processor to perform a method for estimating depths in a scene is provided, the method comprising: causing a light source to emit a sequence of n binary light patterns toward the scene, each of the n binary light patterns comprising at least L columns, wherein each of the n binary light patterns has a minimum stripe width of 8 columns; and wherein $n>\log_2(L)$; causing, for each of the n binary light patterns, an image sensor to capture a binary image of the scene, wherein the image sensor comprises an array including a plurality of single-photon detectors, and wherein the binary image comprises a binary value for each of the plurality of single-photon detectors indicative of whether a photon was detected such that each of the plurality of single-photon detectors generates a set of binary values corresponding to the sequence of n binary light patterns; and estimating, for each of the plurality of single-photon detectors, a depth value based on the set of binary values generated by that single-photon detector.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
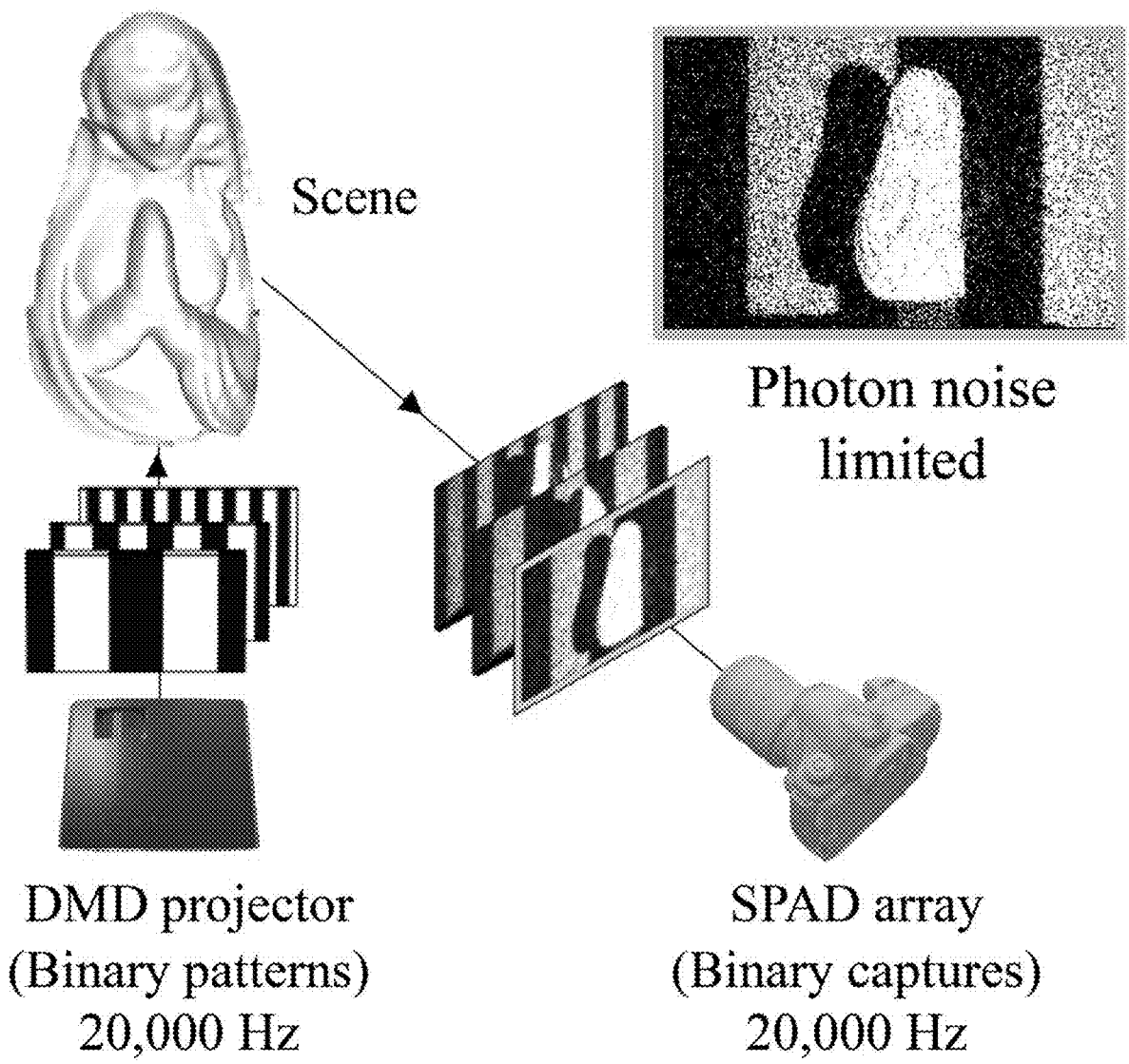
FIG. 1A shows an example setup for estimating depths in a scene using single-photon detectors and binary structured light patterns in accordance with some embodiments of the disclosed subject matter.

In accordance with various embodiments, mechanisms (which can, for example, include systems, methods, and media) for estimating depths in a scene using single-photon detectors and binary structured light patterns are provided.

In some embodiments, mechanisms described herein can be used to implement a structured light (SL) technique that uses single photon avalanche diode (SPAD) arrays (and/or arrays including other single-photon detectors, such as jots) to facilitate 3D scanning at high-frame rates and/or low-light levels. For example, mechanisms described herein can be facilitate "Single-Photon SL" technology, which can involve sensing binary images that indicate the presence or absence of photon arrivals during each exposure. In some embodiments, a SPAD array can be used in conjunction with a high-speed binary projector configured to project a series of binary patterns (e.g., a series of one-dimensional (1D) patterns projected onto the scene, a series of two-dimensional (2D) patterns projected onto the scene, etc.). For example, both devices can be operated at relatively high speeds (e.g., as high as 20 kilohertz (kHz) using current technology). The binary images sensed by the SPAD array can be expected to be heavily influenced by photon noise and to be easily corrupted by ambient sources of light.

In some embodiments, temporal sequences of binary patterns can be implemented using mechanism described herein that are robust to such noise. For example, as described below, the sequence can include error correction codes. As another example, the codes projected as part of the sequence can be designed to be robust to short-range effects, such as projector/camera defocus and resolution mismatch between the SPAD array and the projector. As described below (e.g., in connection with FIG. 11), a device implemented in accordance with some embodiments of the disclosed subject matter was capable of 3D imaging in challenging scenarios involving low-albedo objects, strong ambient illumination, and fast-moving objects.

Recently, interest in SPADs operating without any temporal synchronization has grown for various applications that are challenging for conventional digital imaging devices (e.g., CCD and CMOS-based cameras). For example, technologies that use SPADs in high-dynamic range imaging and burst photography have been explored.

As described below, in some embodiments, mechanisms described herein can utilize a SPAD array to capture a sequence of binary frames, with each frame capturing an image of scene onto a binary pattern has been projected. A frame of the scene can be captured for each binary pattern in a sequence of patterns, and the values recorded in the frames can be used to determine depth values for positions within the scene.

In general, structured light (SL) 3D imaging systems have inherent tradeoffs that balance the precision of the 3D scan against its acquisition time. For example, temporally-multiplexed SL techniques achieve high depth resolution by projecting multiple patterns, however, this precludes high-speed capture. At the other extreme, SL based on spatially modulated patterns can facilitate single-shot scans, but such techniques typically require assumptions of spatial-smoothness that invariably result in loss of detail.

The tradeoffs inherent to SL systems are exacerbated when operating in challenging regimes with low signal-to-noise ratios (SNR) due to low albedo or strong ambient illumination. In such scenarios, the use of longer temporal codes can provide robustness and precision, but at the cost of low acquisition speed. One way to mitigate the loss in time resolution is to use high-speed cameras and projectors. However, this approach is limited by large bandwidth requirements and, perhaps more importantly, the presence of read noise. Each image captured by conventional high-speed cameras has a constant amount of read noise immaterial of the exposure used, which severely limits the signal-to-noise ratio as the exposure times (and hence the image intensities) are reduced.

In some embodiments, mechanisms described herein can facilitate a class of single-photon structured light technologies that are based on single-photon detectors, such as single photon avalanche diodes (SPADs). SPADs can detect the arrival of single photons. For example, SPADs can be operated at very high speeds when used to determine whether a photon has been detected within a particular time period. This can be referred to as a 'photon detection' mode, which can generate measurements that are binary-valued indicating whether or not a photon arrival occurred during a given acquisition time. For example, a recently developed SPAD array can capture ~$10^5$ binary frames at ⅛-th megapixel resolution. In some embodiments, the binary measurements generated by a SPAD in a photon detection mode, which are normally considered a limitation due to limited information, are sufficient for a large family of SL coding schemes that are binary as well. Since SPADs count photon arrivals, the measurements are not corrupted by read noise, and not subject to the tradeoff between fast acquisition times and read noise of a conventional pixel. Additionally, the use of SPADs for SL can leverage the capabilities of high-speed projectors (e.g., projectors that use digital micromirror devices (DMDs)) for displaying binary patterns.

Due to the probabilistic nature of photon arrivals, the binary-valued measurements captured by SPADs can be prone to strong photon noise. For example, in the presence of strong ambient light, the SPAD can detect a photon even when the corresponding projector pixel is dark. Conventional SL coding schemes are designed for regimes where the image measurements are not binary-valued, and hence are not suitable for single-photon SL. In some embodiments, SL encoding strategies using error-correction codes can facilitate robust coding for single-photon SL even under large photon noise. Beyond achieving robustness to photon noise, SL coding schemes must account for various imaging phenomena such as projector/camera defocus. Naive error-correcting codes do not consider these practical effects, and thus cannot be used in a real-world SL system. In some embodiments a class of hierarchical codes are described herein that were designed using error correction and binary phase shifting that guarantee a minimum stripe width, which provides robustness to various non-idealities. Additionally, multiple high-throughput decoding schemes for the describes codes are described to facilitate real-time decoding of the measurements. For example, an implementation of mechanisms described herein can decode a disparity map for a 512×256 detector SPAD array in 100 milliseconds (ms) on a central processing unit (CPU) and 3 ms on a graphics processing unit (GPU).

In some embodiments, mechanisms described herein can facilitate extreme 3D imaging capabilities, including high-speed 3D scanning and robust 3D imaging in low-SNR conditions while respecting low-power and latency budgets.

Figure 1B:
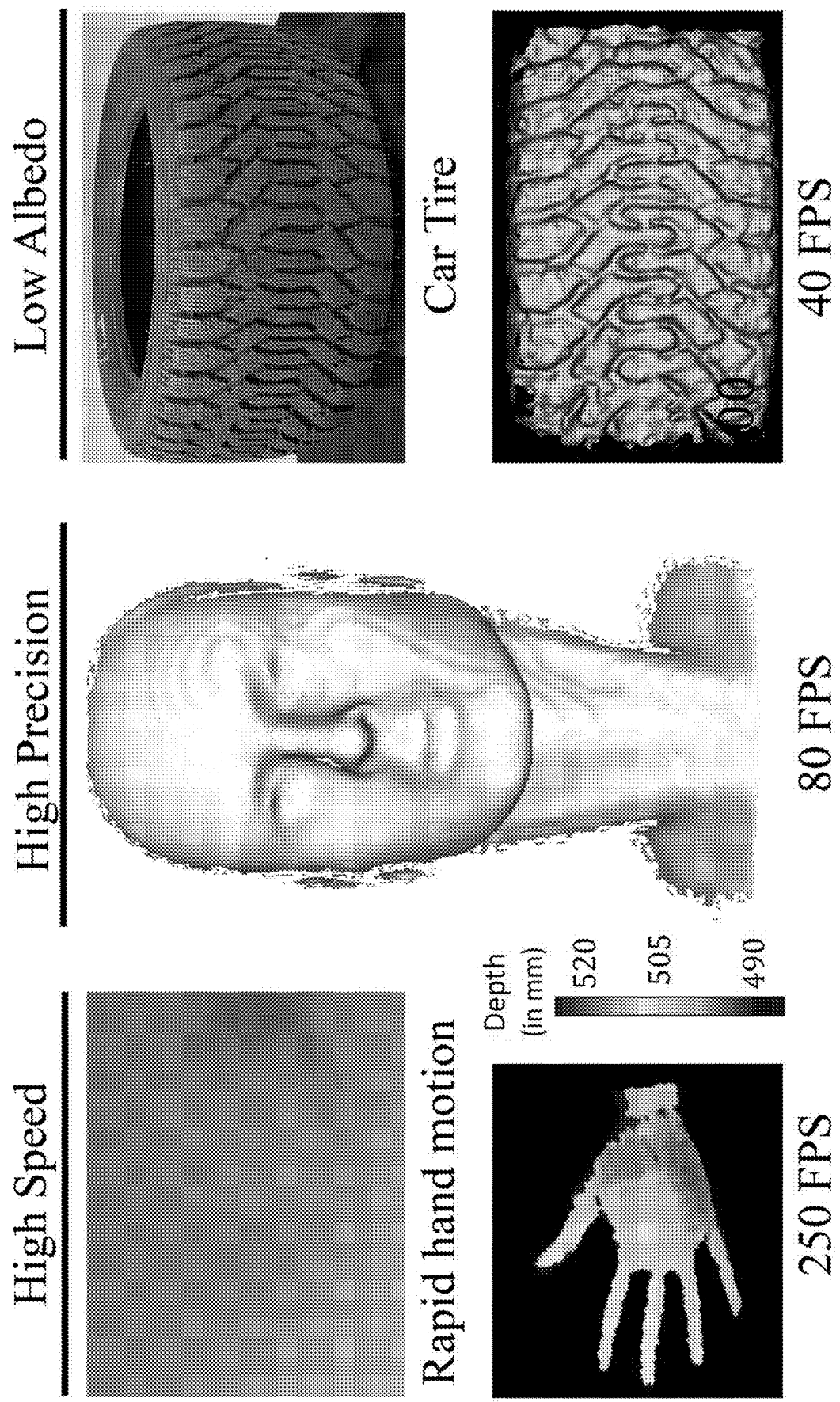
FIG. 1B shows examples of challenging applications in which mechanisms described herein for estimating depths in a scene using single-photon detectors and binary structured light patterns can generate relatively accurate depth information in accordance with some embodiments of the disclosed subject matter.

FIG. 1A shows an example setup for estimating depths in a scene using single-photon detectors and binary structured light patterns in accordance with some embodiments of the disclosed subject matter, and FIG. 1B shows examples of challenging applications in which mechanisms described herein for estimating depths in a scene using single-photon detectors and binary structured light patterns can generate relatively accurate depth information in accordance with some embodiments of the disclosed subject matter.

In FIG. 1A, an example system is shown that includes a SPAD array and a DMD-based projector used to project and acquire binary patterns at extremely high frame rates (e.g., on the order of tens of kilohertz). Coding schemes describes herein can be used to project patterns onto a scene, and obtain depth-maps from photon noise limited captures of the patterns.

In FIG. 1B, several examples showing the practical capabilities of single-photon SL techniques implemented in a prototype system in accordance with some embodiments of mechanisms described herein are shown, including: high-speed scanning of a rapidly moving hand at 250 frames per second (FPS), sub-millimeter precise depth-imaging at a 50 centimeters (cm) range and at 80 FPS, and 3D reconstruction of the tread pattern of a tire visualized as a mesh, a low-albedo object, at 40 FPS (based on a depth map generated using mechanisms described herein). RGB frames of the scenes captured at 30 FPS are also shown for the high speed and low albedo scenes, which illustrate challenges presented by the scenes. As shown in FIG. 1B, the prototype single-photon SL system captured scenes with low albedo (a tire) and at high frame rate (fast hand movements) with little loss in the spatial resolution, and in the case of the hand, without artifacts caused by motion blur.

Mechanisms described herein are subject to limitations endemic to many SL systems. For example, while mechanisms described herein can mitigate short-range effects such as defocus, long-range effects such as interreflections remain to be addressed. Current SPAD technology is in its nascency when compared to conventional CMOS imaging technology. The low-resolution of SPAD arrays and relatively poor fill factors constrain the reconstruction quality of mechanisms described herein. However, mechanisms described herein can be applied to single-photon detector arrays with higher resolution and/or improved fill factors, which are expected to become available as the capabilities of single-photon detector arrays continue to improve with higher resolution arrays featuring increased fill factors.

In general, for a SPAD pixel array observing a scene, the number of photons N arriving at a pixel x during an exposure time $t_{exp}$ can be modelled as a Poisson random variable as follows:

$$Pr\{N = k\} = \frac{(\Phi(x)t_{exp})^k e^{-\Phi(x)t_{exp}}}{k!}, \quad (1)$$

where $\Phi(x)$ is the flux (note that for simplicity, this model assumes a 100% quantum efficiency for simplicity, and uses the term "flux" interchangeably with the arrival rate of photo-electrons), and k is a positive integer number of photon arrivals (e.g., 0≤k). During each exposure, a pixel can be modeled as detecting at most one photon, returning a binary value B(x) such that B(x)=0 if the pixel receives no photons; otherwise, B(x)=1. Accordingly, B(x) can be considered a Bernoulli random variable with $$Pr\{B(x)=0\}=e^{-(\Phi(x)+r_q)t_{exp}}, \quad (2)$$

where r q is the dark current rate (the rate of spurious counts unrelated to incident photons).

In some embodiments, a scene can be illuminated with a sequence of binary patterns from a projector (e.g., varying along one dimension, such as along columns of the project, or varying in multiple dimensions, such as along both columns and rows). In some embodiments, a SPAD array can capture a binary frame corresponding to each pattern. Over a series of frames, each SPAD pixel generates a binary code over time, from which the projector column observed at the pixel can be estimated, and based on the identity of the projector column a depth for the pixel can be estimated (an operation that is critical for the success of any SL technique).

Note that although mechanisms described herein are generally described in connection with SPADs (which have advantageous properties, such as very high frame rates, and the absence of read noise), this is an example, and mechanisms described herein can be implemented using other single-photon detector technologies, such as jots (e.g., as described in Fossum et al., "The quanta image sensor: Every photon Counts," Sensors, (2016)), which feature high-resolution arrays with smaller pixels and increased photon-efficiency than conventional CMOS and CCD sensors, albeit at lower frame-rates and higher read noise than SPADs.

Figure 2:
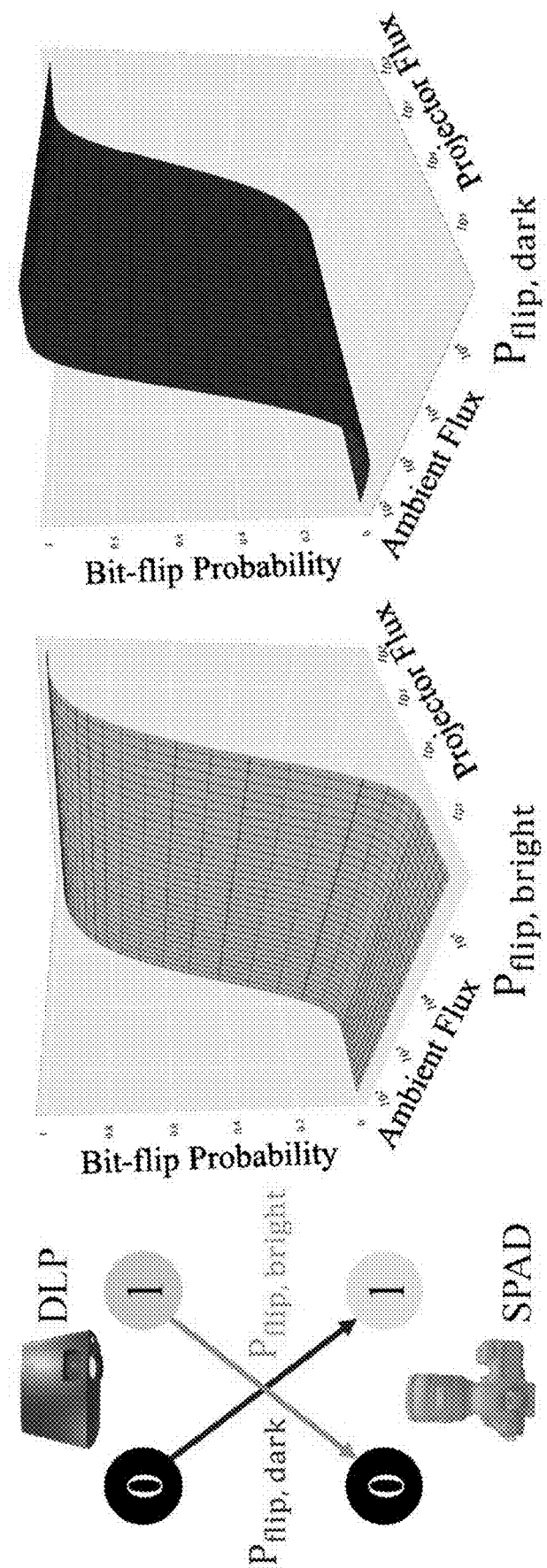
FIG. 2 shows an example of bit flip errors that can occur in a system for estimating depths in a scene using single-photon detectors and binary structured light patterns implemented in accordance with some embodiments of the disclosed subject matter.

FIG. 2 shows an example of bit flip errors that can occur in a system for estimating depths in a scene using single-photon detectors and binary structured light patterns implemented in accordance with some embodiments of the disclosed subject matter. As described above, photon arrivals at a single-photon detector (e.g., a SPAD) can be modeled as a Poisson random variable. In practice, this means that a particular pixel (e.g., implemented using a single-photon detector, such as a SPAD) may or may not detect a photon in a given frame regardless of whether the portion of the scene corresponding to the pixel has been illuminated with a bright portion of the pattern projected onto the scene for the frame, or has not been illuminated (e.g., a photon from an ambient light source can be detected). A detection of a photon for a dark portion of the scene (e.g., a portion corresponding to a dark portion of the pattern) can be considered a dark bit flip error, and an absence of a photon detection for a bright portion of the scene (e.g., a portion corresponding to a bright portion of the pattern) can be considered a bright bit flip error.

A probability that a projected temporal sequence will be decoded incorrectly can be derived based on the probability of bit flip errors, and can be influenced by the coding scheme that is used to encode depths into the sequence of patterns that is projected onto the scene, and/or the decoding scheme used to attribute a projector column to each pixel of the array (and accordingly a depth to a point in the scene imaged by the pixel).

For a given binary pattern, consider a SPAD pixel x that observes a scene point illuminated by an ON projector pixel. Suppose the incident photoelectron arrival rate at x due to projector and ambient illumination are $\Phi_p(x)$ and $\Phi_a$, respectively. Then, the probability of a bit-flip error (the probability of the SPAD pixel not detecting a photon) can be expressed as $$P_{flip,bright}=Pr\{B(x)=0|\Phi(x)=\Phi_a+\Phi_p(x)\} \quad (3)$$

Similarly, the probability of a bit-flip error when the projector pixel is OFF (the probability of detecting a photon in spite of not illuminating the corresponding projector pixel) can be expressed as:

$$P_{flip,dark}=Pr\{B(x)=1|\Phi(x)=\Phi_a\}. \quad (4)$$

The bit-flip probabilities for "bright" and "dark" pixels, visualized in FIG. 2 for varying $\Phi_a$ and $\Phi_p$, (are not equal due to the asymmetric role played by the ambient photons, which causes single-photon SL to be influenced by an asymmetric noise model. FIG. 2 shows bit-flip probabilities as determined by EQS. (3) and (4) evaluated across a grid of $(\Phi_a, \Phi_p)$ flux values. The plot parameters are $t_{exp}=10^{-4}$ S and dark current rate $r_q=0$.

The probability of incorrectly decoding of an L-length Gray code can be determined using the bit flip probabilities described in EQS. (3) and (4). Since it is possible to observe any L-bit binary code, the average probability of erroneous decoding over all codewords can be expressed as:

$$Pr\{error\} = 1 - \left(1 - \left(\frac{P_{flip,bright} + P_{flip,dark}}{2}\right)\right)^L \quad (5)$$

A derivation of EQ. (5) is described in Appendix A, which is hereby incorporated herein by reference in its entirety.

Figures 3A, 3B:
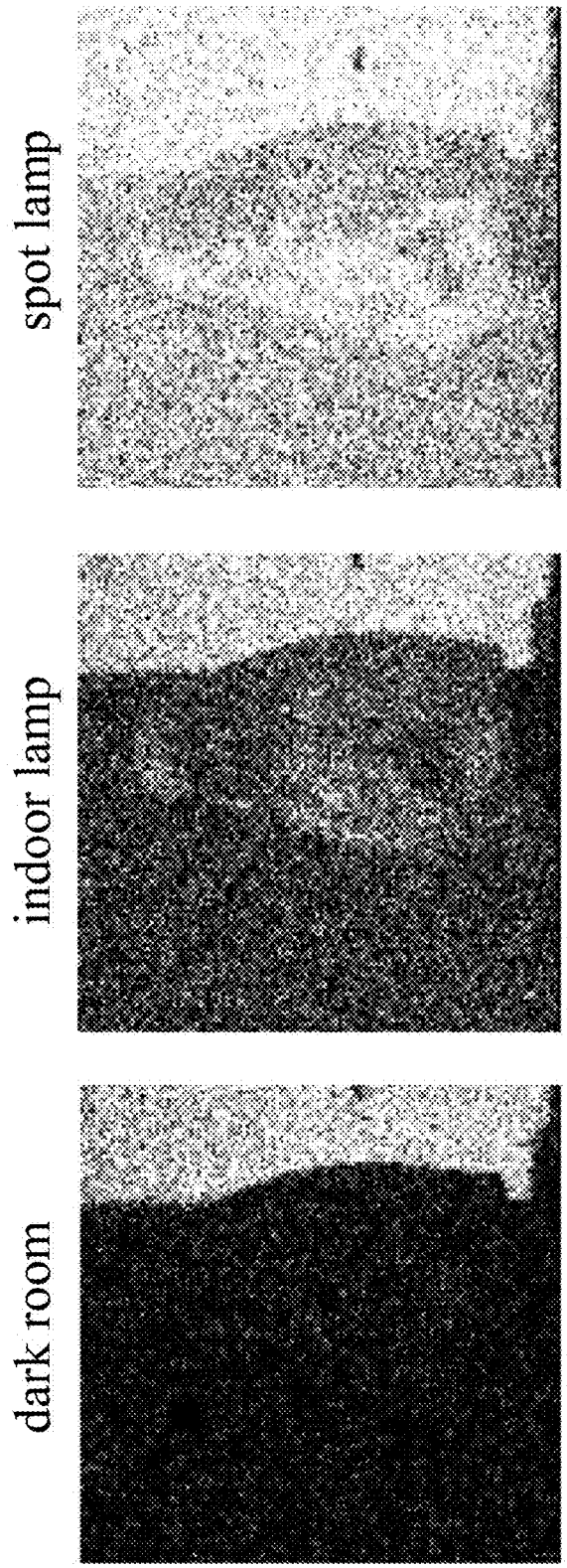
FIG. 3A shows examples of bit flip probabilities under various conditions in a system for estimating depths in a scene using single-photon detectors and binary structured light patterns implemented in accordance with some embodiments of the disclosed subject matter.
FIG. 3B shows examples of binary frames captured using a single-photon camera under the various conditions described in connection with FIG. 3A.

FIG. 3A shows examples of bit flip probabilities under various conditions in a system for estimating depths in a scene using single-photon detectors and binary structured light patterns implemented in accordance with some embodiments of the disclosed subject matter, and FIG. 3B shows examples of binary frames captured using a single-photon camera under the various conditions described in connection with FIG. 3A. More particularly, FIGS. 3A and 3B illustrate typical bit-flip probabilities observed in a prototype implemented in accordance with some embodiments of the disclosed subject matter under different ambient illumination conditions at an exposure of $10^{-4}$ S per frame. Using these probabilities, the decoding error probability for a code sequence of length L=10 was derived, which is presented in FIG. 3A. The error probabilities in FIG. 3A were derived based on the average probability (across all 10 bit codewords) of a decoding error when using a Gray code. A similar derivation can be performed for any code scheme of length L that uses a set of codewords corresponding to the set of all possible L length binary codes. In FIG. 3B, a pattern was projected onto a scene (the scene shown in FIG. 11) where the left half of the pattern is dark (i.e., projector pixels are OFF) and the right half is bright (i.e., projector pixels are OFF). At higher ambient intensities, more photons are detected in the "dark" region (i.e., there are more dark bit flip errors at higher intensity) which makes reliable decoding a challenge. Additionally, at higher ambient intensities fewer pixels in the bright region fail to detect a photon, leading to fewer bright bit flip errors. As illustrated in FIG. 3B, however, the rate of decrease in bright bit flip errors is much lower than the rate of increase in dark bit flip errors.

As shown in FIGS. 3A and 3B, increasing ambient light levels dramatically increases $P_{flip,dark}$, which can lead to near-certain decoding failure using a relatively simple code, such as the L=10 gray code analyzed in connection with FIGS. 3A and 3B. As described below, mechanisms described herein can be used to implement coding strategies for single-photon SL that facilitate accurate decoding even in extremely challenging low SNR conditions (e.g., with very high ambient intensity levels and/or low projector intensity levels), including low scene albedo, rapid motion, and strong ambient illumination.

Figure 4A:
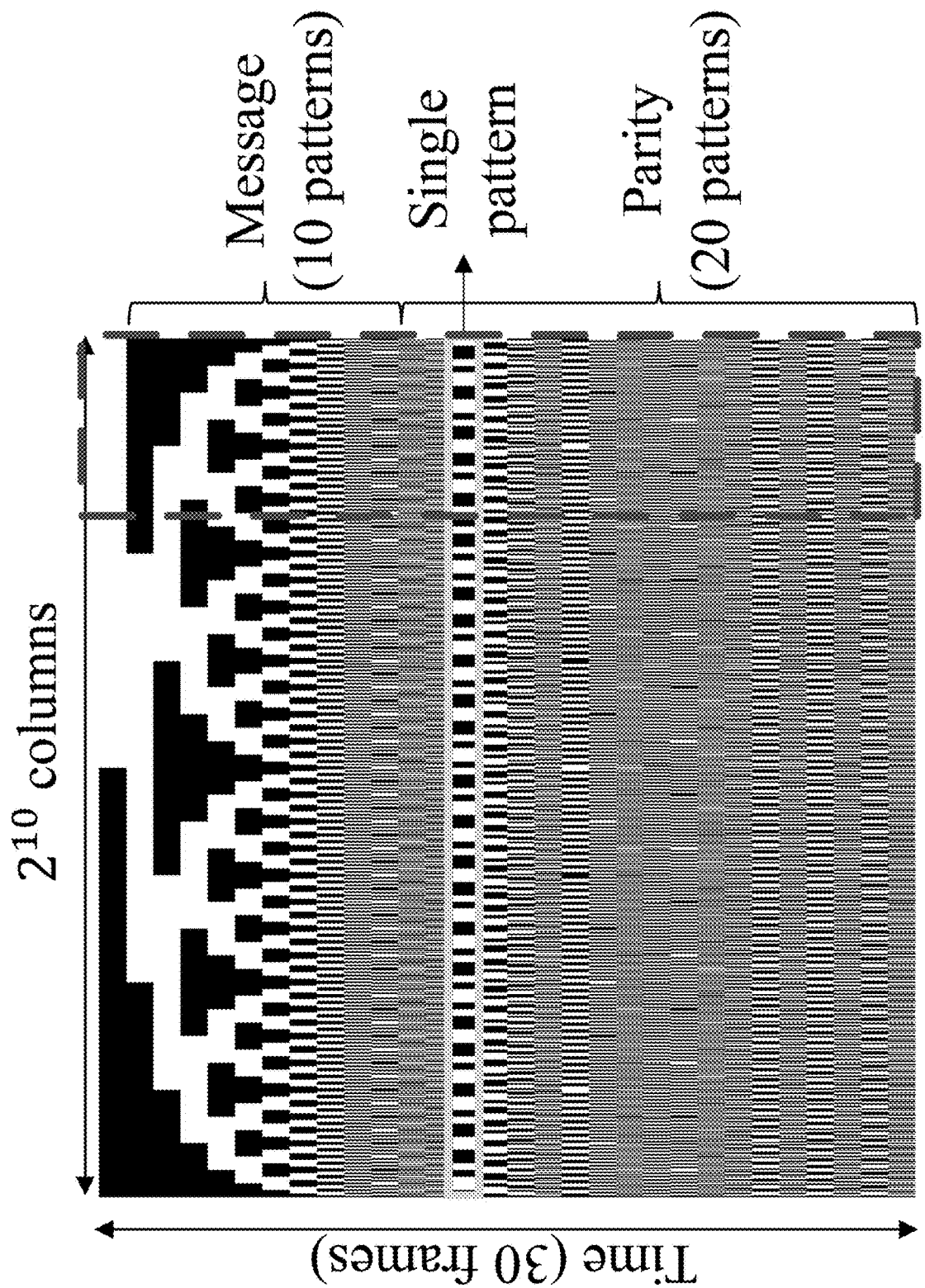
FIG. 4A shows an example of a Bose-Chaudhuri-Hocquenghem (BCH) encoding of a Gray code that can be used to project a series of binary codes onto a scene in a system for estimating depths in a scene using single-photon detectors and binary structured light patterns in accordance with some embodiments of the disclosed subject matter.
Figure 4B:
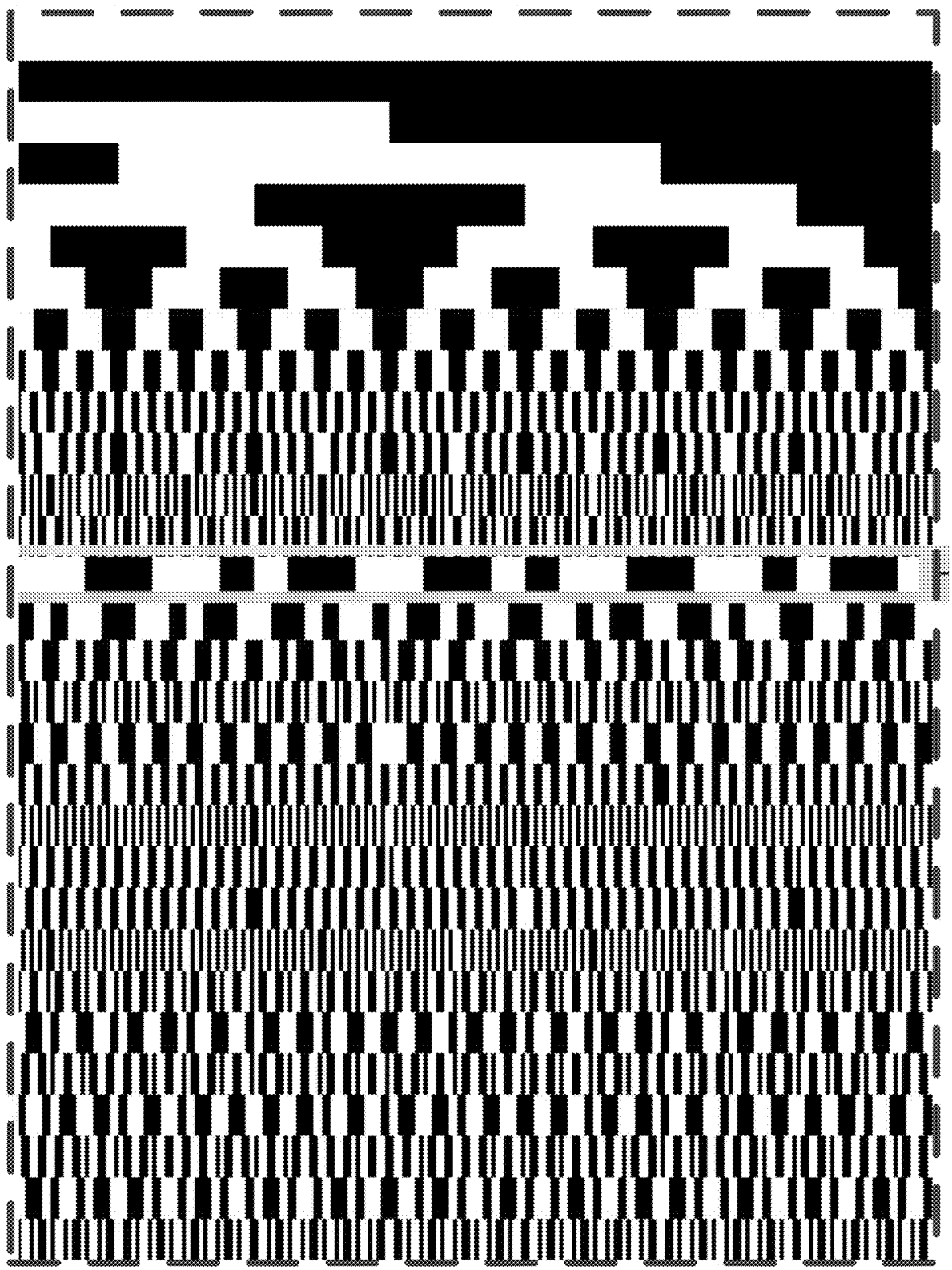
FIG. 4B shows an example of a portion of each code of FIG. 4A enlarged to show higher frequency patterns.

FIG. 4A shows an example of a Bose-Chaudhuri-Hocquenghem (BCH) encoding of a Gray code that can be used to project a series of binary codes onto a scene in a system for estimating depths in a scene using single-photon detectors and binary structured light patterns in accordance with some embodiments of the disclosed subject matter, and FIG. 4B shows a portion of each code of FIG. 4A enlarged to show higher frequency patterns. More particularly, FIGS. 4A and 4B show a BCH(31, 11, 11) encoding of a 10-bit Conventional Gray message. Systematic encoding was used where the message comprises the first 10 patterns, followed by 20 parity patterns (for BCH(31, 11, 11)). FIG. 4B shows an enlargement of a portion of the code (e.g., corresponding to about 20% of the projector columns) to illustrate higher frequency portions of the code. In the examples of FIGS. 4A, 4B, 6A, and 6B, black regions represent "0"s and white regions represent "1" s. For example, the first row (i.e., the first pattern) of FIGS. 4A and 4B is all white, indicating that each column is a "1" (i.e., "ON"). However, inverting the patterns (e.g., such that the first row is all "0", the second row is bright on the left and dark on the right, etc.) would not be expected to impact the effectiveness of the codes.

Various temporal coding schemes are described herein for single-photon SL that can provide various advantages. For example, coding schemes described herein can achieve robustness to random bit-flips (e.g., using error correction mechanisms). As another example, coding schemes described herein can be robust to various other sources of error in SL systems (e.g., projector/camera defocus).

In some embodiments, a relatively simple strategy to improve the reliability of any coding scheme is to repeat the projected patterns and perform a majority vote. This can be expected to be a viable option in certain circumstances since the high-speed projection and capture of single-photon detectors (e.g., SPADs) and fast projectors (e.g., DMDs) affords high temporal redundancy. For example, given a code sequence of length L=10, the pattern can be repeated 25 times (which can be referred to herein as the redundancy factor), and still maintain a high overall frame rate for 3D capture. Such a majority vote can generally be expected to improve the decoding performance, provided the probability of bit flips is sufficiently small (e.g., less than 0.5). However, extreme conditions (e.g., dark objects and/or strong ambient light) can lead to larger bit-flip probabilities resulting in large overall errors. As described below, coding schemes can be implemented for single-photon SL that perform better than simple repetition. In general, findings in coding theory indicate that repetition as an error-correcting mechanism is suboptimal when compared to more sophisticated schemes.

In some embodiments, mechanisms described herein can use a family of binary error-correcting codes, sometimes referred as the Bose-Chaudhuri-Hocquenghem (BCH) codes, which have been used in various applications ranging from QR codes to satellite communication. In some embodiments, using BCH to encode a sequence for single-photon SL can provide various advantages, such as near-optimal relative distance and error-correcting capabilities especially at large redundancy factors, which is well suited to the operational setting in single-photon SL (e.g., where binary frame rates can be captured at high frame rates on the order of at least tens of kilohertz).

In some embodiments, a BCH(n,j,d):$\{0,1\}^j \to \{0,1\}^n$ encoder that takes input messages of length J and produces output codewords of length n that are at least d-bits apart can be used to generate a coding scheme with redundancy and/or error correction properties for use with a single-photon SL system. For example, such a coding scheme can provide error correction capabilities up to $$\left\lfloor \frac{d-1}{2} \right\rfloor$$

bit flips in the worst case or adversarial sense (e.g., the maximum number of bit flips that can occur, given a coding scheme, while still guaranteeing exact error correction). For example, if the worst case error correction is U bit flips, then there exists a perturbation corresponding to U+1 bit-flips where exact error correction is not possible (considered across the entire set of codewords). Note that the worst case error correction is often more pessimistic than average sense, since the perturbations that produce the sequence of bit-flips that cannot be exactly corrected may occur with extremely low probability.

This worst-case error-correcting capacity of BCH codes is significantly higher than what can be achieved using a simple repetition of the code. For example, BCH(63, 10, 27), which uses 63-length codewords to encode messages of length 10, can correct up to 13 worst-case errors, while the corresponding capability for Repetition(60, 10, 6), where the message pattern is repeated 6 times, can correct only 2 errors. In a more particular example, in the context of single-photon SL, the main source of bit flips can be expected to be photon noise (e.g., especially in the case of low albedo objects and/or high intensity ambient light), which is stochastic and non-adversarial, and thus error correction beyond the worst-case regime can be expected.

In some embodiments, the parameters of a BCH encoder can be selected based on various considerations, such as an overall time budget (e.g., a total acquisition time to generate estimate depths in a scene), target robustness to errors (e.g., bit flip errors, one or more other sources of error such as projector/camera defocus, etc.). Considering a projector capable of projecting a pattern with C columns (e.g., each column being on or off, producing a binary pattern). In some embodiments, projector patterns can be specified such that each column is assigned a unique binary code (which can be referred to as a binary codeword) with in-built BCH error correction. To produce the projector patterns, a base binary coding scheme that uniquely represents each projector column can be selected, for example, with Gray codes.

Given a set of message codes $\{m_i\} \subseteq \{0,1\}^L$, where $L = \lceil \log_2 C \rceil$, a BCH encoder $\varepsilon_{BCH(n,j,d)}$ can be selected that is capable of encoding at least C messages (e.g., an encoder with $j \geq L$) and output column-wise codes $\{c_i = \varepsilon_{BCH(n,j,d)}(m_i)\}$.

For example, FIG. 4A shows a BCH (31, 11, 11) encoding of 10-bit Gray code messages. Since $L < j$ here (e.g., because there a BCH with n=31 and k=10 does not exist), shortening (e.g., the message can be prepended by (j−L) zeros) can be used (note that using such a shortening technique can reduce error correction performance), and the leading zeros can be omitted from transmission, thereby reducing the projected code length from n to n−(j−L). In such an example, an all-zero pattern frame can be omitted, and for decoding a zero can be appended to all codewords prior to decoding.

In some embodiments, systematic encoding (in which the first L-bits of each code is the message itself that is BCH encoded) can be used, such that each sequence can start with message patterns appended by parity patterns. Alternatively, in some embodiments, the message patterns and the parity patterns can be arranged in any sequence (e.g., the sequence can start with the parity patterns, the parity and message patterns can be randomly distributed within the sequence, etc.).

In some embodiments, the choice of n (a length of the BCH code), can simultaneously impact the robustness of the code as well as the loss in time resolution. For example, longer codes have better error-correction capabilities. However, since a larger temporal sequence is captured before generating a depth estimate, the longer code reduces the ability to handle fast(er) moving objects. Results described below were at one of two operating points n={63, 255}, which covers two distinct scenarios. Note that although mechanisms described herein are often described in connection with BCH encoding (which has advantageous properties, as described herein), this is an example, and mechanisms described herein can be implemented using other binary error correction schemes. For example, mechanisms described herein can be used in connection with Golay codes (e.g., with fixed redundancy), Reed-Muller codes, concatenated codes, or any other suitable binary error correction schemes.

Figure 5:
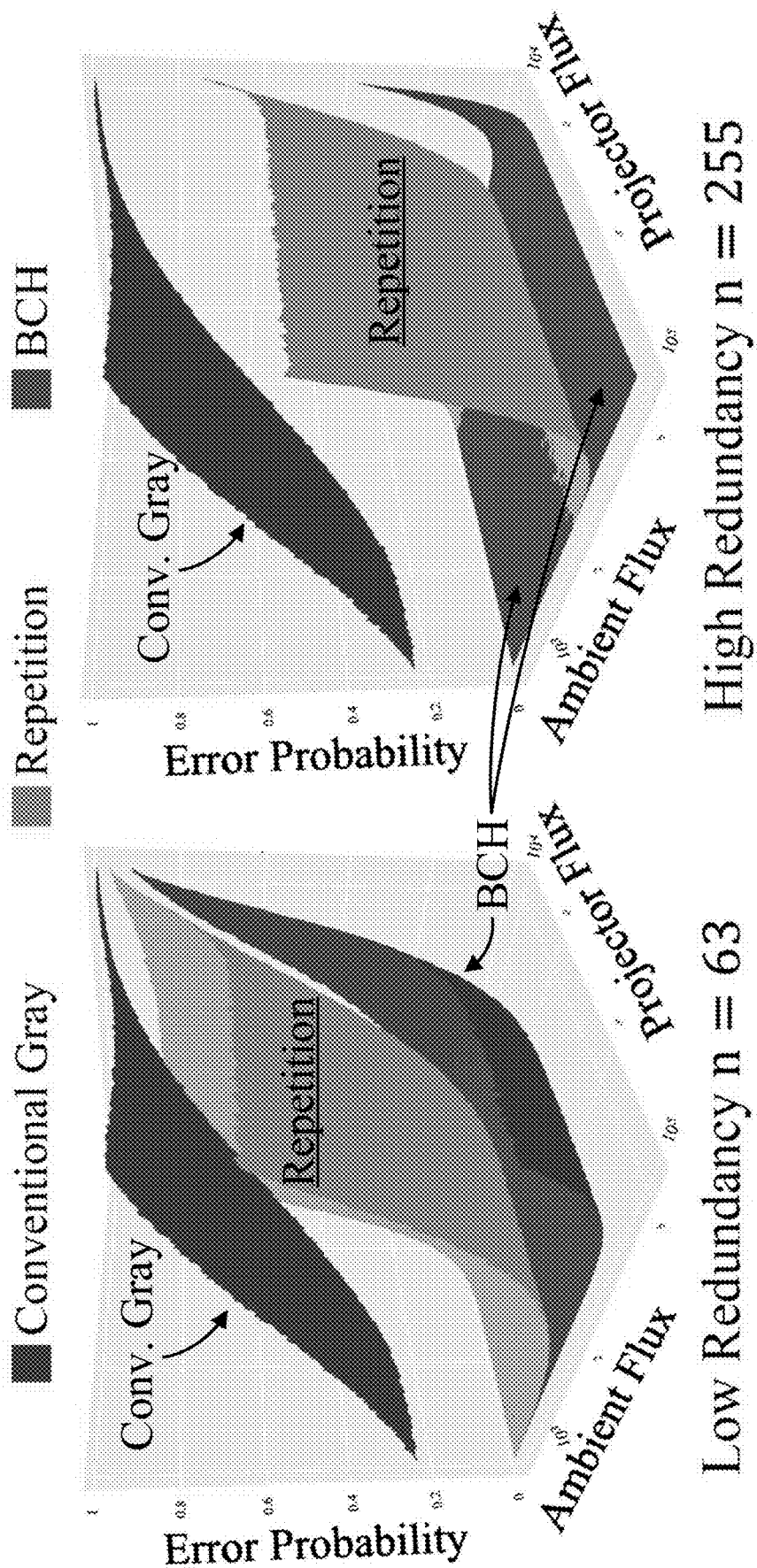
FIG. 5 shows an example of probabilities of a decoding error using various coding schemes, including a BCH encoding of a Gray code scheme with different levels of redundancy.

FIG. 5 shows an example of probabilities of a decoding error using various coding schemes, including a BCH encoding of a Gray code scheme with different levels of redundancy. In FIG. 5, a result of a Monte-Carlo evaluation of BCH and repetition strategies is shown, in comparison to using a L=10 conventional Gray message (i.e., using the first 10 rows shown in FIG. 4A). The empirical probability of decoding error was evaluated when receiving a codeword randomly corrupted by bit-flips. As described above in connection with FIG. 2., the amount of ambient flux ($\Phi_a$) and projector flux ($\Phi_p$) at a pixel location impacts the bit-flip probability, and as shown in FIG. 5, impacts the probability of a decoding error. FIG. 5 compares performance of conventional Gray codes, repetition codes (in this example, repeating the conventional Gray code six times) and BCH codes for 10-bit binary messages (e.g., each message corresponding to the first ten rows of a column of the sequence shown in FIG. 4A). As described herein, each message can be referred to as a codeword, such that each column is associated with a different codeword. The BCH encoders evaluated in FIG. 5 used n={63,255} to encode the conventional Gray code message. As shown in FIG. 5, both repetition and BCH strategies improved robustness of conventional Gray codes to photon noise. Additionally, BCH outperforms repetition at all ($\Phi_a$, $\Phi_p$) with a pronounced difference at higher redundancies.

The results shown in FIG. 5 illustrate benefits of BCH encoding. At most operating points, the decoding error probability of BCH codes is either close to zero or provides an order of magnitude improvement over repetition, which in turn provides at least an order of magnitude improvement in most operating points over using the Gray code without further encoding.

Figure 6A:
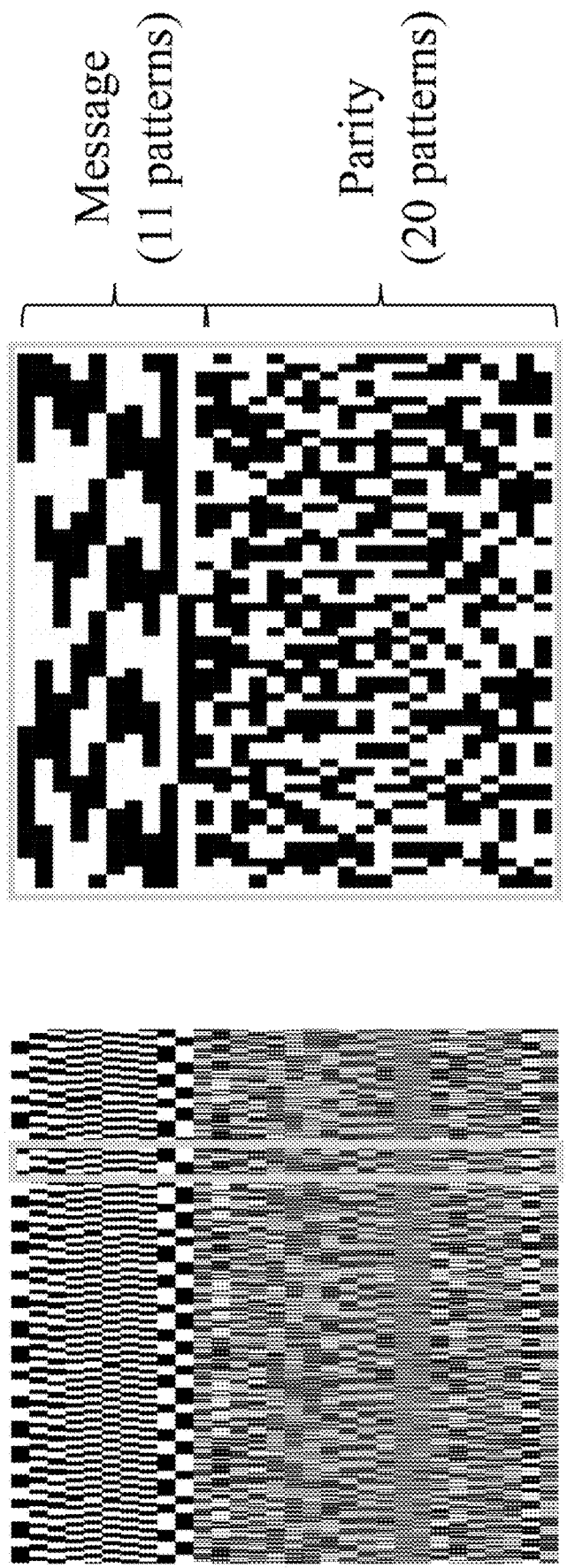
FIG. 6A shows an example of a BCH encoding of a long-run Gray code that can be used to project a series of binary codes onto a scene in a system for estimating depths in a scene using single-photon detectors and binary structured light patterns in accordance with some embodiments of the disclosed subject matter.

FIG. 6A shows an example of a BCH encoding of a long-run Gray code that can be used to project a series of binary codes onto a scene in a system for estimating depths in a scene using single-photon detectors and binary structured light patterns in accordance with some embodiments of the disclosed subject matter.

Figure 6B:
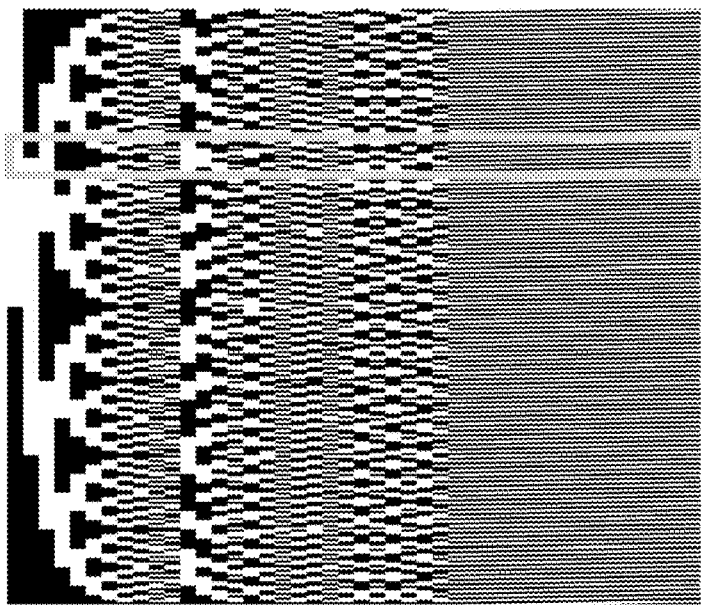
FIG. 6B shows an example of a hybrid code that can be used to project a series of binary codes onto a scene in a system for estimating depths in a scene using single-photon detectors and binary structured light patterns in accordance with some embodiments of the disclosed subject matter, the hybrid code including a BCH encoding of a first portion of a Gray code and stripe encoding of a second portion of the Gray code.

FIG. 6B shows an example of a hybrid code that can be used to project a series of binary codes onto a scene in a system for estimating depths in a scene using single-photon detectors and binary structured light patterns in accordance with some embodiments of the disclosed subject matter, the hybrid code including a BCH encoding of a first portion of a Gray code and stripe encoding of a second portion of the Gray code. Note that although the pattern in FIG. 6B is implemented using BCH encoding, a hybrid code can be implemented using any suitable encoding of the message, such as Golay codes (e.g., with fixed redundancy), Reed-Muller codes, concatenated codes, or any other suitable binary error correction schemes More particularly, FIGS. 6A and 6B show binary pattern sequences implemented using a BCH(31, 11, 11) and a hybrid, strategy, respectively, used to encoding 11-bits (with 2048 columns). The BCH encoded patterns in FIG. 6A include several high spatial-frequency (e.g., strip-width ≤2) frames, even when using long-run Gray codes (max min-SW) as the underlying message. In comparison, the hybrid code in FIG. 6B uses BCH encoding for the first 8 bits of each message and stripe encoding for the remaining 3 bits, resulting in a minimum stripe width of at least 8 pixels (e.g., a minimum stripe width of 8 columns in each pattern).

Beyond achieving robustness to photon noise, the format of a SL coding scheme can impact robustness to various other imaging non-idealities. A majority of the BCH encoded patterns, such as the pattern shown in FIG. 4A, include high-spatial frequency patterns that can reduce performance under projector/camera defocus and/or resolution mismatch between the projector and camera. Accordingly, despite achieving low errors in theory, BCH encoding not perform well in a practical SL system using current technologies.

In some embodiments, an approach that can be used to mitigate such short-range effects is to use codes that can be referred to as long-run Gray codes, which are a subset of Gray codes that maximize the shortest stripe width across all the projected patterns. However, applying BCH encoding on such long-run Gray codes also results in a majority of patterns in the parity portion of the containing high-spatial frequencies (e.g., as shown in FIG. 6A). Finding binary messages $\{m_i\}$ that result in BCH patterns $\{c_i\}$ with maximized stripe widths is an intractable combinatorial problem with an exorbitant solution space (1024! candidate messages).

In some embodiments, mechanisms described herein can use hierarchical codes where BCH encoding is done on a subset of message bits (e.g., the more significant bits (MSBs)) of the base Gray code pattern. This can mitigate the occurrence of BCH-encoded patterns (e.g., corresponding to frames) that have high frequency stripe widths (stripe-widths≤2). For example, as shown in FIG. 6B, all BCH encoded have relatively large minimum stripe widths and thus relatively low frequencies, making them more robust to defocus effects. In some embodiments, the remaining lower significant bits (LSBs) of the message bits can be resolved using a binary version of phase-shifting where a binary pattern is shifted one-pixel-at-a-time (e.g., shifted one column of the projector) and its phase is computed.

For example, in some embodiments, an L-length message code can be divided into multiple sets (e.g., two sets), the $L_{BCH}$ MSBs and the remaining $L_{stripe}=L-L_{BCH}$ LSBs, and the multiple sets can be coded in different ways. The L BCH MSBs can be coded using BCH (e.g., as described above in connection with FIGS. 4A and 4B). Note that because the message codes corresponding to a specific MSB pattern remain unchanged for all values of the LSBs, the resulting BCH codes have a stripe width of at least $2^{L_{stripe}}$. The $L_{stripe}$ LSBs can be coded using periodic stripe patterns. For example, in some embodiments, each of the $2^{L_{stripe}}$ message codes can be encoded using a coded message of length $2^{L_{stripe}+1}$ with a burst of $2^{L_{stripe}}$ ones whose starting position (or phase) encodes the message. FIG. 6B shows the codewords arising for such a hybrid construction applied to a Gray code. The hybrid code shown in FIG. 6B can guarantee an overall stripe width of at least $2^{L_{stripe}}$ pixels. In the implementation shown in FIG. 6B, for a L=10-bit message, $L_{BCH}=7$ and $L_{stripe}=3$, providing a minimum stripe width of $2^3=8$ pixels. Additionally, BCH encoders with n E {63,255} and j≥7 were used.

In some embodiments, the stripe patterns in the last 16 patterns can be decoded by estimating the phase delay, offering significant robustness to random bit-flips.

Note that although particular pattern sequences are described herein, mechanisms described herein can be used to implement many other suitable pattern sequences that can be used to implement a single-photon SL system. In some embodiments, each pattern in a sequence of patterns can have a minimum stripe width. As described above, wider stripe widths can mitigate defocus and/or resolution mismatch between the projector and single-photon image sensor. The minimum stripe width of each pattern can be the shortest number of consecutive columns (or rows) in the pattern that are the same value (e.g., 0 or 1). For example, as described above in connection with FIG. 6B, the patterns each include 1024 columns, and the minimum number of consecutive 1s or 0s is 8. Increasing the minimum stripe width can mitigate errors caused by defocus. However, increasing the minimum stripe width can also reduce the amount of redundancy that can be provided in a given number of patterns, or can require more patterns (a higher n) to maintain a particular amount of redundancy. In some embodiments, the impact of a particular minimum stripe width on depth accuracy can depend on various factors, such as the optics of the single-photon SL system, and how closely the projector resolution matches the image sensor resolution. For example, a minimum stripe width of 8 improved accuracy in the prototype systems described below in connection with FIGS. 11-15. A system that is implemented with high quality optics and/or with projector and image sensor resolutions that are more closely can achieve a similar benefit from a smaller minimum stripe width. In some embodiments, the minimum stripe width of a pattern can be 4 bits, 8 bits, 16 bits, or any other suitable value. Note that although pattern sequences shown in FIGS. 4A, 6A, and 6B are based on a systematic encoding scheme (e.g., using Gray codes, and using a particular encoder to generate parity bits), mechanisms described herein can be used with pattern sequences that exhibit certain properties, without corresponding to any particular encoding scheme. In some embodiments, a sequence of patterns can be implemented that have properties, such as a minimum stripe width, a number of patterns n that is greater than a minimum number (e.g., $n>\log_2(L)$) required to encode a unique codeword for each column (or row depending on the implementation of the system). For example, the number of patterns can be at least twice as many as the number of patterns required to encode a unique codeword for each column (e.g., $n>2 \log_2(L)$). As another example, the number of patterns can be at least 3 times, 4 times, 5 times, 6 times, 7 times, 8 times, 9 times, 10 times, 20 times, 25 times, 30 times, etc., as many as the number of patterns required to encode a unique codeword for each column.

Figure 7:
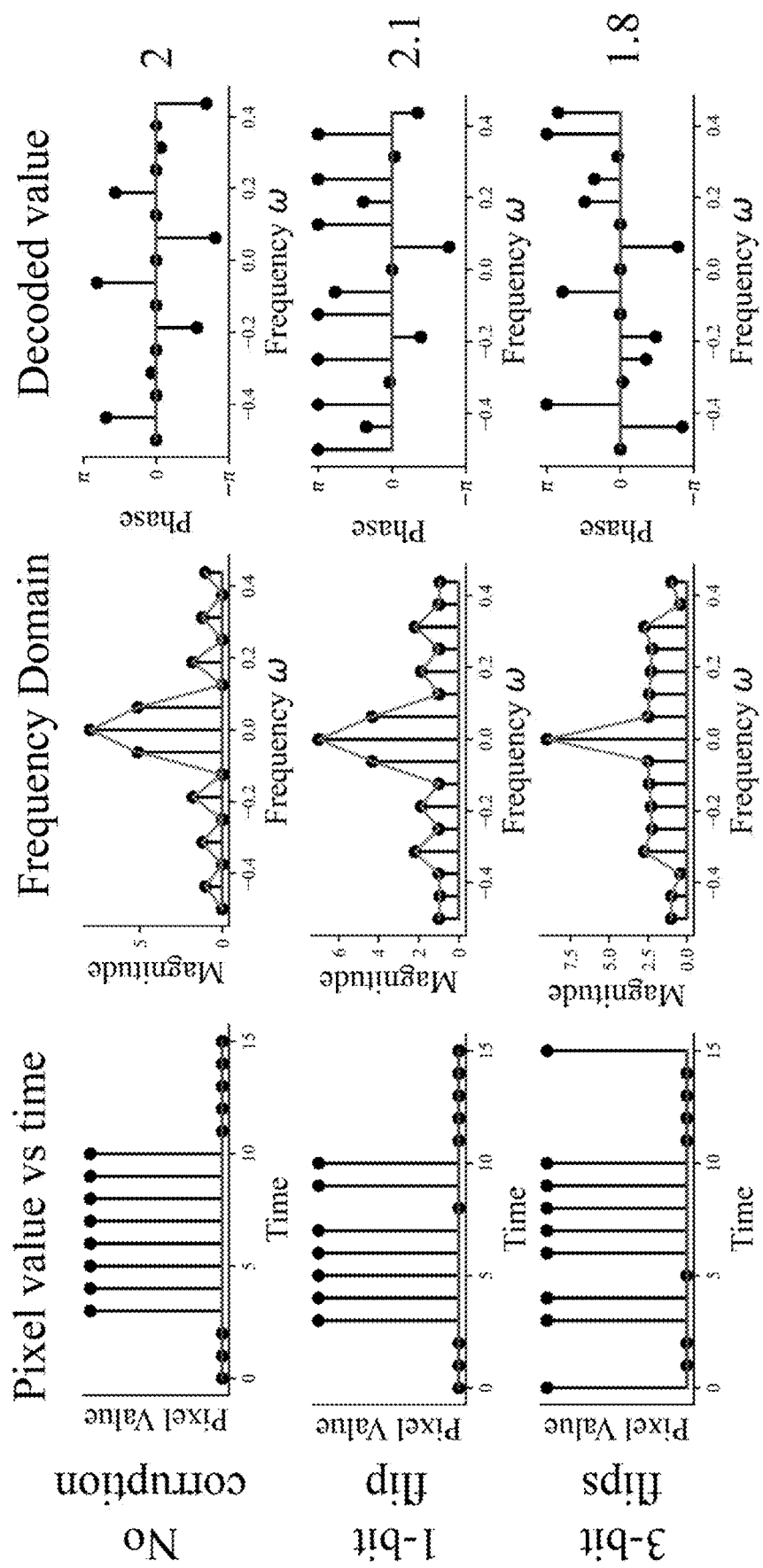
FIG. 7 shows examples photon detections in frames corresponding to projection of a portion of a stripe pattern, frequency domain representations of the photon detections, and a decoded value corresponding to each frequency domain representations.

FIG. 7 shows examples photon detections in frames corresponding to projection of a portion of a stripe pattern, frequency domain representations of the photon detections, and a decoded value corresponding to each frequency domain representations. In some embodiments, stripe scanning offers robustness to random bit flips. In FIG. 7, values from the final 16 frames of a sequence of frames are shown. As shown in FIG. 7, the decoded outputs are close to noise-free equivalents, even with multiple bit-flips occurring in the input. Decoding can include taking a Fourier transform of the received signal to obtain the phase delay.

As illustrated in FIG. 7, even when multiple bits are flipped, the decoded value is close to the correct value. As described below, the hybrid code's error-correcting capabilities can be compared to repeated long-run Gray codes of similar codelength. Since the hybrid code's outputs can have sub-pixel precision, the performance was characterized using root mean squared error (RMSE).

Figure 8:
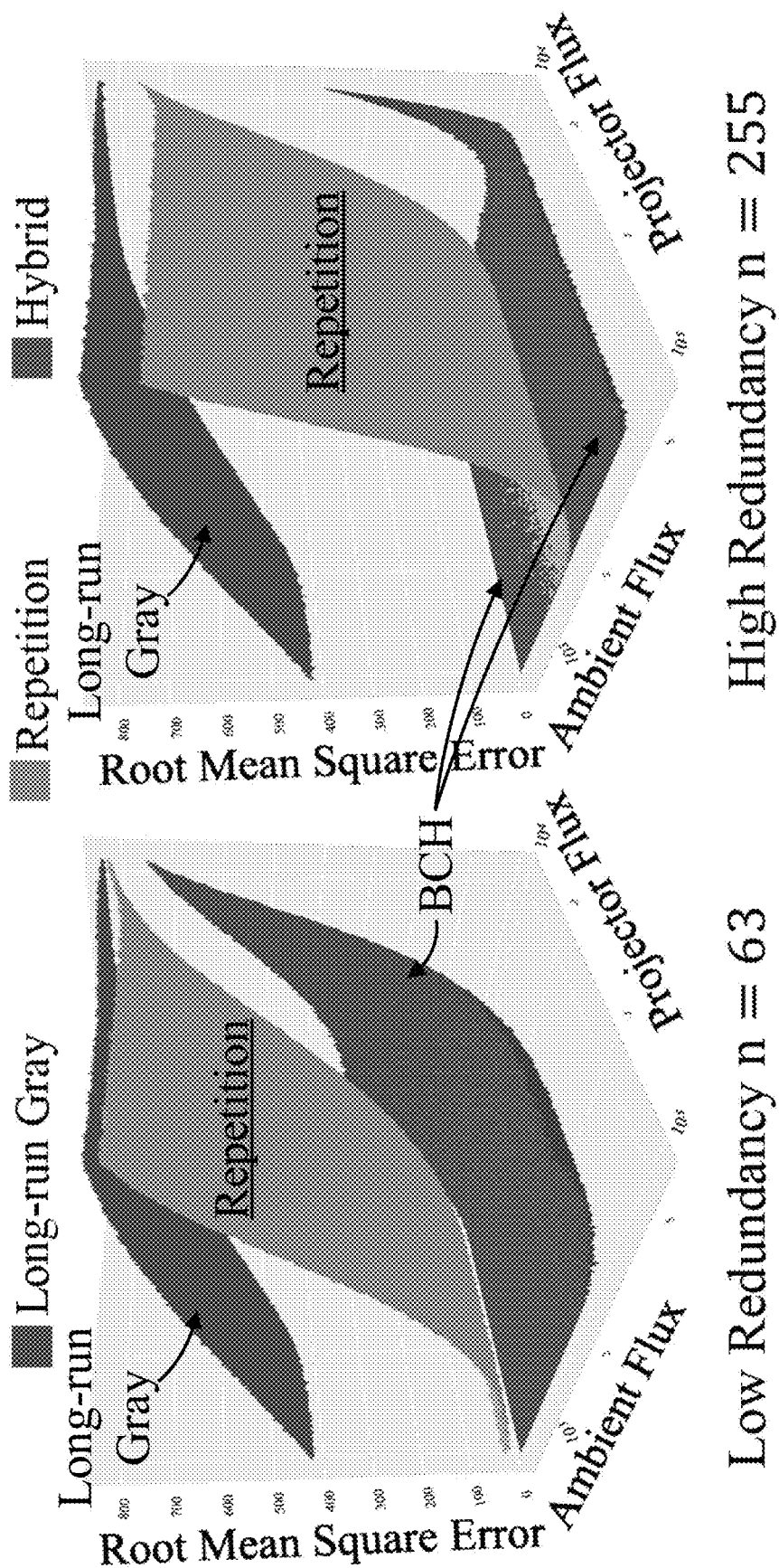
FIG. 8 shows an example of probabilities of a decoding error using various coding schemes, including a long-Gray code scheme, a long-Gray code scheme with repetitions, and a hybrid code including a BCH encoding of the first 8 bits of each message, and stripe encoding of the last 3 bits of each message with different levels of redundancy.

FIG. 8 shows an example of probabilities of a decoding error using various coding schemes, including a long-Gray code scheme, a long-Gray code scheme with repetitions, and a hybrid code including a BCH encoding of the first 8 bits of each message, and stripe encoding of the last 3 bits of each message with different levels of redundancy. The long-run Gray results in FIG. 8 are for a sequence of patterns corresponding to the first 11 rows shown in FIG. 6A, and the repetition results in FIG. 8 are for the sequence of patterns corresponding to the first 11 rows shown in FIG. 6A repeated six times.

As shown in FIG. 8, hybrid codes are more robust to photon noise than repeated long-run Gray codes, evaluated across a grid of ($\Phi_a$, $\Phi_p$) photon fluxes. Patterns that are robust to projector defocus and resolution-mismatch effects are advantageous for single-photon SL. The results shown in FIG. 8 compare repetition with long-run Gray codes (as described above having a minimum stripe width in any given row of at least 8 columns), and hybrid codes. For a 10-bit message, both repeated long-run Gray and hybrid codes have a minimum stripe width of 8 pixels.

As shown in FIG. 8, hybrid codes outperform repeated long-run Gray codes, and the gap increases at higher redundancy factors.

Figure 9:
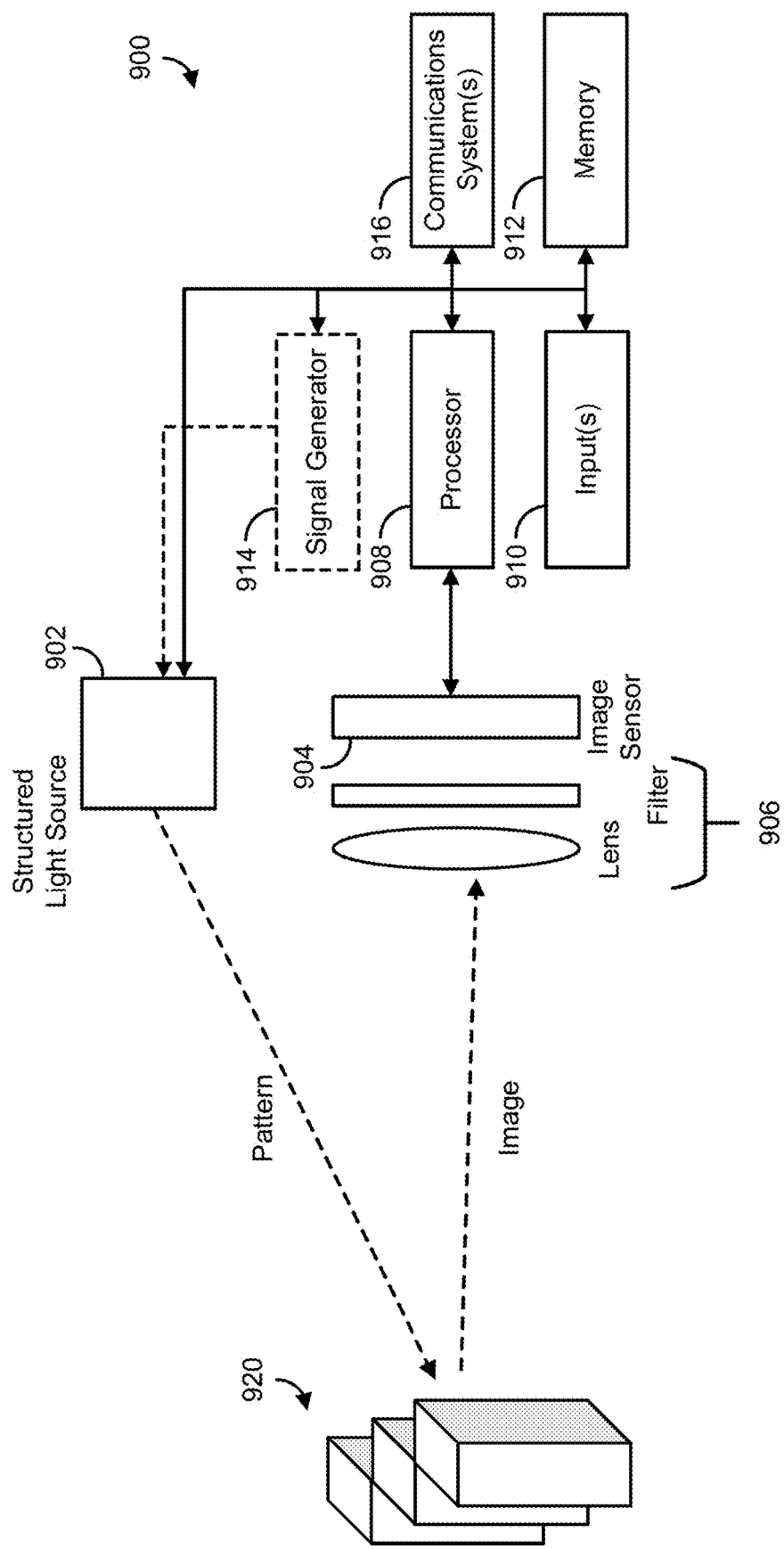
FIG. 9 shows an example of a system for estimating depths in a scene using single-photon detectors and binary structured light patterns in accordance with some embodiments of the disclosed subject matter.

FIG. 9 shows an example 900 of a system for estimating depths in a scene using single-photon detectors and binary structured light patterns in accordance with some embodiments of the disclosed subject matter. As shown in FIG. 9, system 900 can include a structured light source 902; an image sensor 904; optics 906 (which can include, for example, a lens, a filter, etc.); a processor 908 for controlling operations of system 900 which can include any suitable hardware processor (e.g., a central processing unit (CPU), a graphics processing unit (GPU), an accelerated processing unit (APU), a microprocessor, a digital signal processor, a microcontroller, an image processor, etc., one or more of which can be implemented using a field programmable gate array (FPGA) or an application specific integrated circuit (ASIC)) or combination of hardware processors; an input device 910 (such as a shutter button, a menu button, a microphone, a touchscreen, a etc.) for accepting input from a user and/or from the environment; memory 912; a signal generator 914 for generating one or more signals for driving structured light source 902 (e.g., if light source 902 is configured to generate arbitrary patterns, rather than a fixed sequence of patterns that is pre-programmed into light source 902); and a communication system or systems 916 for allowing communication between processor 908 and other devices, such as an automated system (e.g., an automated industrial inspection system, an automated manufacturing system, an autonomous vehicle, etc.), a semi-automated system, a smartphone, a wearable computer, a tablet computer, a laptop computer, a personal computer, a game console, a server, etc., via a communication link.

In some embodiments, memory 912 can store binary values output by image sensor 904, depth values, etc. Memory 912 can include a storage device (e.g., a hard disk, a solid state drive, a Blu-ray disc, a Digital Video Disk (DVD), RAM, ROM, EEPROM, etc.) for storing a computer program for controlling processor 908. In some embodiments, memory 912 can include instructions for causing processor 908 to execute processes associated with the mechanisms described herein, such as processes described below in connection with FIG. 10.

In some embodiments, light source 902 can be any suitable light source that can be configured to emit patterned light toward a scene 920. In some embodiments, light source 902 can be implemented using any suitable spatial light modulator, that can be selectively controlled to emit light toward one or more portions of the scene or inhibit light from being emitted toward one or more portions of the scene. For example, light source 902 can include (or be associated with) a spatial light modulator configured to emit patterns onto scene 920. In a more particular example, light source 902 can include (or be associated with) an array of micro mirrors that can be selectively oriented to emit light toward the scene or inhibit light from being emitted toward the scene (e.g., implemented with a DMD chip). In some embodiments, light source 902 can include an array of light sources (e.g., LEDs, laser diodes, etc.) that can be controlled (e.g., individually addressed, addressed by column, etc.) to create a particular pattern of varying intensity across one or more dimensions of scene 920. In some embodiments, light source 902 can be implemented using a scanning laser beam (e.g., a raster scan laser) that is controlled to vary intensity as it is scanned across the scene.

In some embodiments, image sensor 904 can include multiple single-photon detectors (e.g., arranged in an array). For example, image sensor 904 can include an array of multiple single-photon detectors (e.g., SPADs, jots, etc.). As another example, image sensor 904 can be a hybrid array including one or more single-photon detectors (e.g., SPAD detectors) and one or more conventional light detectors (e.g., CMOS-based pixels, CCD-based pixels). As still another example, image sensor 404 can be multiple image sensors, such as a first image sensor that includes one or more single-photon detectors (e.g., used to generate depth information) and a second image sensor that includes one or more conventional light detectors (e.g., CMOS-based pixels, CCD-based pixels, etc.) that is used to generate ambient brightness information and/or image data. In such an example, optical components can be included in optics 906 (e.g., multiple lenses, a beam splitter, etc.) to direct a portion of incoming light toward the single-photon based image sensor and another portion toward the conventional image sensor.

In some embodiments, image sensor 904 can include on-chip processing circuitry that can be used to output a value for each frame (e.g., indicating that a photon was detected, or was not detected) and/or that can be used to generate depth estimates on the image sensor, which can be output to processor 908, which can facilitate a reduction in the volume of data transferred from image sensor 904. For example, single-photon detectors of image sensor 904 can be associated with circuitry that implements at least a portion of process 1000, described below.

In some embodiments, optics 906 can include optics for focusing light received from scene 920, one or more bandpass filters (e.g., narrow bandpass filters) centered around the wavelength of light emitted by light source 902, any other suitable optics, and/or any suitable combination thereof. In some embodiments, a single filter can be used for the entire area of image sensor 904 and/or multiple filters can be used that are each associated with a smaller area of image sensor 904 (e.g., with individual pixels or groups of pixels).

In some embodiments, signal generator 914 can be one or more signal generators that can generate signals to control light source 902. As described above in connection with light source 902, in some embodiments, signal generator 914 can generate a signal that indicates which portions of light source 902 are to be activated or not activated (e.g., using a binary image to be projected). Although a single signal generator is shown in FIG. 9, any suitable number of signal generators can be used in some embodiments. Additionally, in some embodiments, signal generator 914 can be implemented using any suitable number of specialized analog circuits each configured to output a signal that can be used to control a spatially varying projection of light onto a scene (e.g., scene 920). In some embodiments, processor 904 can perform functions described above that are attributed to signal generator 914. Signal generator 914 can be omitted in some embodiments.

In some embodiments, system 900 can communicate with a remote device over a network using communication system(s) 916 and a communication link. Additionally or alternatively, system 900 can be included as part of another device, such as an automated system, a semi-automated system, a security system, a smartphone, a tablet computer, a laptop computer, etc. Parts of system 900 can be shared with a device within which system 900 is integrated. For example, if system 900 is integrated with an automated industrial inspection system, processor 908 can be a processor of the automated system and can be used to control operation of system 900. As another example, if system 900 is integrated with an autonomous vehicle (e.g., an autonomous car) or other autonomous mobile system (e.g., a mobile robot), processor 908 can be a processor of the autonomous system and can be used to control operation of system 900.

In some embodiments, system 900 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as an automated system, a semi-automated system, a digital camera, a security camera, an outdoor monitoring system, a smartphone, a wearable computer, a tablet computer, a personal data assistant (PDA), a personal computer, a laptop computer, a multimedia terminal, a game console or peripheral for a gaming counsel or any of the above devices, a special purpose device, etc.

Communications by communication system 916 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between system 900 and another device, such as a network link, a dial-up link, a wireless link, a hard-wired link, any other suitable communication link, or any suitable combination of such links. System 900 and/or another device (e.g., a server, a personal computer, a smartphone, etc.) can enable a user to execute a computer program that uses information derived using the mechanisms described herein to, for example, identify one or more surfaces in a scene that can be approximated as a portion of a plane.

Note that data received through the communication link or any other communication link(s) can be received from any suitable source. In some embodiments, processor 908 can send and receive data through the communication link or any other communication link(s) using, for example, a transmitter, receiver, transmitter/receiver, transceiver, or any other suitable communication device.

Figure 10:
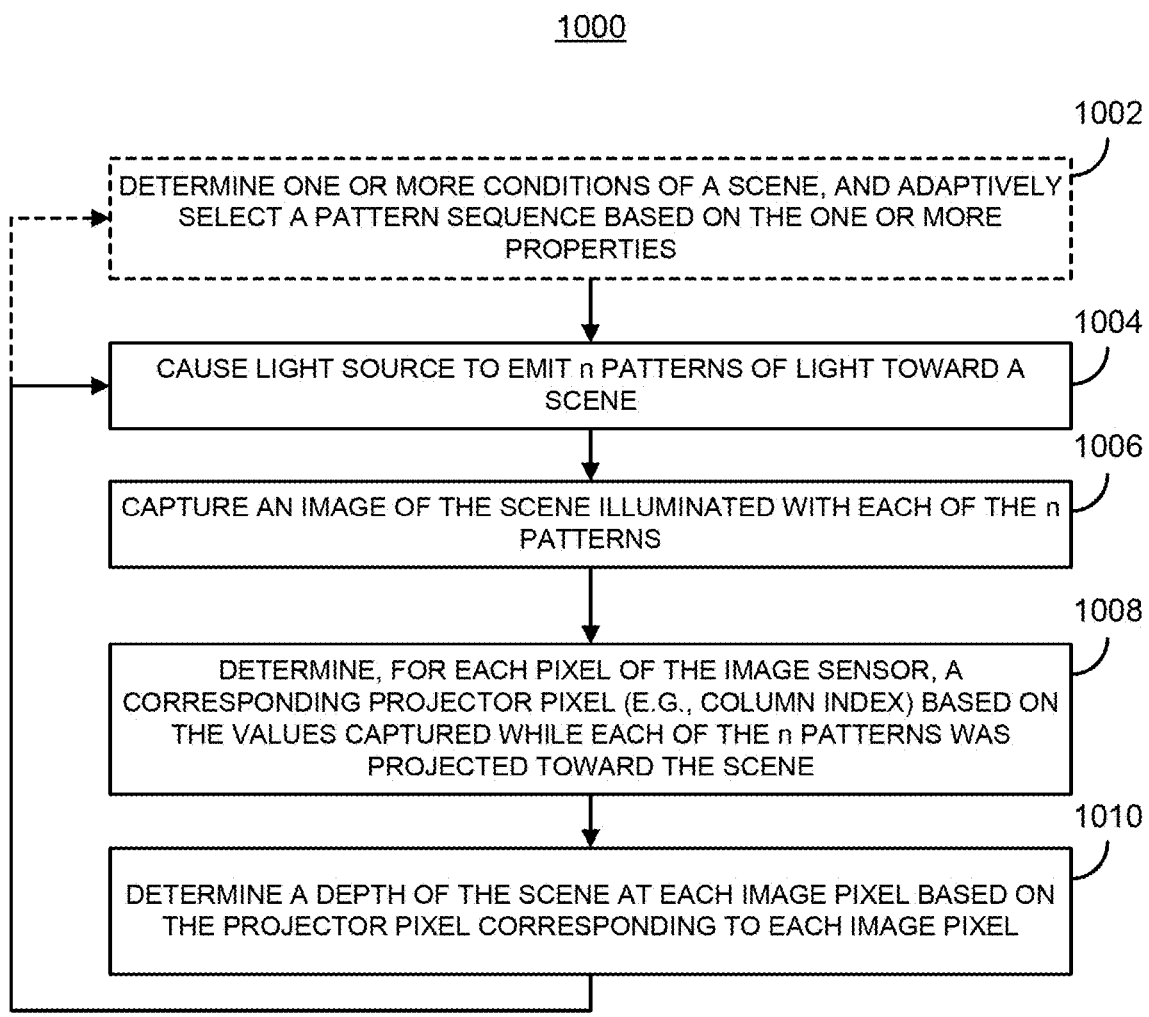
FIG. 10 shows an example of a process for estimating depths in a scene using single-photon detectors and binary structured light patterns in accordance with some embodiments of the disclosed subject matter.

FIG. 10 shows an example 1000 of a process for estimating depths in a scene using single-photon detectors and binary structured light patterns in accordance with some embodiments of the disclosed subject matter.

At 1002, process 1000 can determine condition(s) of a scene, and can adaptively select a pattern sequence based on the one or more properties. For example, process 1000 can cause an image sensor to capture one or more images of a scene to be imaged (e.g., using image processor 902 and/or another processor). Such an image can be captured using ambient light to determine conditions of the environment in which the image sensor(s) are being used. Additionally or alternatively, any other suitable sensor (e.g., a light meter, a thermal measurement device, etc.) can be used to capture information about the environment and/or scene. In some embodiments, process 1000 can cause the image sensor(s) to capture an image without illumination using a pattern and/or using a uniform illumination pattern, which can be used to evaluate environmental conditions.

In some embodiments, process 1000 can evaluate scene conditions based on the captured image using any suitable technique or combination of techniques. For example, process 1000 can determine the amount of ambient light in the scene using the image(s) captured at 1002. As another example, process 1000 can determine an albedo of one or more objects in the scene using the image(s) captured at 1002. As another example, process 1000 can determine an amount of scene motion of one or more objects in the scene using the image(s) captured at 1002.

In some embodiments, process 1000 can select an illumination pattern sequence (e.g., a coding scheme) based on the scene condition(s). For example, some coding schemes are capable of generating precise measurements in low ambient light conditions with a relatively short sequence of patterns (e.g., a coding scheme with lower levels of redundancy), but are more susceptible to errors brighter ambient light conditions. As another example, some coding schemes are capable of generating precise measurements in high ambient light conditions with a relatively long sequence of patterns (e.g., a coding scheme with higher levels of redundancy), but are more susceptible to sources of noise, such as motion blur, in scenes with a lot of motion. In such an example, process 1000 can determine whether the conditions are more favorable for a particular coding scheme, and can select a coding scheme accordingly.

At 1004, process 1000 can cause a light source (e.g., light source 902) to emit a series of n patterns of light toward a scene. For example, the n patterns can be patterns in a BCH-encoded sequence (e.g., as shown in FIGS. 4A and 6A) that includes n patterns that encodes messages of length L<n. As another example, the n patterns can be patterns in a hybrid sequence (e.g., as shown in FIG. 6B) that includes n patterns that encode messages of length L<n.

In a more particular example, process 1000 can cause the light source to emit a series of n patterns of which L<n patterns represent a coding message from which depths can be decoded, and (n−L)>L patterns represent an encoding of the coding message (e.g., which can be referred to as parity patterns) from which depths can be independently decoded. In such an example, the (n−L) patterns can represent a BCH encoding of the L patterns.

In another more particular example, process 1000 can cause the light source to emit a series of n patterns, including a first set of patterns representing a portion of a coding message, a second set of patterns representing information in a second portion of the coding message encoded into phase of a stripe pattern, such that the first set of patterns and the second set of patterns can be used to decode depths in the scene, and a third set of patterns that represent an encoding of the first portion of the coding message (e.g., encoding a number of least significant bits using a phase of a striped pattern, as described above in connection with FIG. 6B).

As another example, process 1000 can cause the light source to emit a series of n (e.g., n≥50, n≥100, n≥150, n≥200, n≥250) patterns that have been generated to exhibit certain properties (e.g., generated by randomly altering the series of patterns until the series of patterns exhibits the properties). Such patterns can each be one-dimensional (1D). For example, process 1000 can cause the light source to project each pattern as columns, each being bright or dark, without variation along each column. As another example, process 1000 can cause the light source to project each pattern as rows, each being bright or dark, without variation along each row.

Alternatively, in some embodiments, one or more of such patterns can each be two-dimensional (2D). For example, process 1000 can cause the light source to project each pattern as variations along multiple directions. In such an example, each pattern can include variations along one or more columns and along one or more rows.

In such an example, the random patterns can be constrained to exhibit certain properties, such as a minimum (e.g., at least 4 pixels, at least 8 pixels, at least 16 pixels, etc.) stripe width in pixels (e.g., along each column or row in a 1D pattern, along both columns and rows in a 2D pattern), a unique codeword associated with each column index (or row index) across a series of 1D patterns, a unique codeword associated with each pixel across a series of 2D patterns, a number of codewords in the series of patterns that is smaller than the space of all possible codewords, error correction, or combinations thereof.

In some embodiments, process 1000 can cause a light source (e.g., light source 902) to emit a series of n patterns of light toward a scene, where the n patterns exhibit certain properties. For example, the patterns can have a minimum (e.g., at least 6 pixels, at least 7 pixels, at least 8 pixels, at least 9 pixels, at least 10 pixels, at least 16 pixels, etc.) stripe width in pixels (e.g., along each column or row in a 1D pattern, along both columns and rows in a 2D pattern), which can mitigate defocus and/or resolution mismatch between the projector and single-photon image sensor. As another example, each column (or row) of the light source can be associated with a unique binary codeword associated with each column index (or row index) across a series of 1D patterns, a unique binary codeword associated with each pixel across a series of 2D patterns, a number of codewords in the series of patterns that is smaller than the space of all possible codewords. Associating each column (or row, or pixel) with a unique binary code word can facilitate identification of a detected sequence of photons to a particular column (or row), which can facilitate more accurate depth detection. As still another example, the number of patterns included in the n patterns of light can be greater than the number of minimum number of patterns needed to uniquely identify the number of columns (e.g., for light patterns that include $2^{10}$ columns, the number of patterns can be greater than 10). In such an example, using more than the minimum number of bits to encode a codeword can facilitate error correction, and result in more accurate depth estimation.

At 1006, process 1000 can cause a binary image of the scene illuminated by each of the n patterns to be captured (e.g., by image sensor 904). For example, in connection with projecting each pattern at 1004 (e.g., while projecting each pattern, within a particular period of time of each pattern being projected), process 1000 can capture an image of the scene illuminated by a particular pattern. In a more particular example, process 1000 can use the projection of a pattern to trigger capture of an image by image sensor 904. In another more particular example, process 1000 can initiate projection of the pattern by the light source at 1004, and capture of an image of the scene illuminated by the light source at 1006 substantially simultaneously.

At 1008, process 1000 can determine, for each pixel of the image sensor, a corresponding projector pixel (e.g., a column index, a row index, etc.) based on the sequence of values in the images captured at 1006 while each pattern was being projected toward the scene. In some embodiments, process 1000 can use any suitable technique or combination of techniques to determine which projector pixel (e.g., a column index c) corresponds to the imaging pixel.

In some embodiments, various techniques can be used to decode a depth value (e.g., for a particular pixel) using frames (e.g., binary frames) corresponding to binary patterns (e.g., patterns described above in connection with FIGS. 4A, 4B, 6A, and 6B) projected by an associated light source.

In some applications, such as robotic navigation, augmented reality, and high-throughput industrial inspection, obtaining depth maps at speeds comparable to conventional frame acquisition rates can be important. For example, generating depth maps at a rate of at least thirty depth maps per second, at least forty depth maps per second, at least sixty depth maps per second, at least 100 depth maps per second, at least 120 depth maps per second, etc. For conventional codes, like Gray and repetition codes, decoding can be performed analytically, and thus, extremely fast. While analytical decoding techniques (e.g., the Berlekamp Massey algorithm) with polynomial runtime exist for BCH codes as well, such techniques can only correct up to the worst-case error (Hamming) limit, which is often insufficient due to a potentially large number of bit-flips caused by photon noise. In some embodiments, any suitable relatively fast decoding technique can be used to decode BCH-based codes and hybrid codes described above in connection with FIGS. 4A, 4B, 6A, and 6B. In some embodiments, decoding techniques described herein can be used to achieve real-time decoding, while also handling a relatively large number of individual bit-flip errors.

In some embodiments, process 1000 can use a minimum distance decoding scheme for single-photon SL. For example, a minimum distance decoding (MDD) techniques can be used, in which a measured codeword is compared against every projected code word. MDD, while conceptually simple, can correct errors beyond the worst-case limit unlike analytic decoding algorithms. Note that the exact number of correctable errors depends on $(\Phi_a, \Phi_p)$ with MDD being a maximum likelihood decoder when $P_{flip,bright} \approx P_{flip,dark}$. MDD can be computationally expensive, potentially precluding real-time performance in certain SL schemes. However, single-photon SL techniques described herein have certain favorable properties that lead to a fast MDD-based decoding procedure. For example, the space of messages (number of projector columns, $\sim 2^{10}$) is significantly smaller than space of codewords (e.g., $2^n$, $n \in \{63, 255\}$). As another example, the number of queries for decoding, which is the number of pixels in the SPAD sensor, can be expected to exceed the number of messages. Under these circumstances, MDD can be expected to provide high-throughput decoding.

A brute-force implementation of MDD has exorbitant memory requirements ($0(2^{2k}n)$). However, a nearest-neighbor algorithm can be used to mitigate high memory requirements, such as nearest-neighbor algorithms that make use of tree-based structures, CPU popcounts, multi-threading, and/or single-instruction, multi data (SIMD) vectorization. For example, nearest-neighbors techniques that can be modified to decode depths in connection with mechanisms described herein are described in Aumüller et al., "Ann-benchmarks: A benchmarking tool for approximate nearest neighbor algorithms," in International Conference on Similarity Search and Applications (2017), and Shimomura et al., "A survey on graph-based methods for similarity searches in metric spaces," Information Systems, 95:101507 (2021).

In some embodiments, different portions of a sequence captured by a single-photon detector can be decoded using different techniques. For example, for a hybrid code (e.g., as described above in connection with FIG. 6B), the more significant bits (MSBs) can be decoded using an MDD technique, and less significant bits (LSBs) can that are encoded in a binary shifted pattern (e.g., stripes shown in FIG. 6B) can be decoded based on the phase shift (e.g., using the frequency domain, using a matched filter). In such embodiments, the results of the two different analyses can be used to determine a column to which the sequence corresponds (e.g., which can be used to determine a depth estimate for the detector that captured the sequence).

As another example, KeOps (e.g., described in Charlier et al., "Kernel operations on the gpu, with autodiff, without memory overflows," Journal of Machine Learning Research, 22(74):1-6 (2021)) and FAISS (e.g., as described in Johnson, et al., "Billion-scale similarity search with gpus," IEEE Transactions on Big Data (2019)) are nearest-neighbors techniques that can also provide GPU-based acceleration.

Based on comparisons (described in Appendix A, which has been incorporated by reference herein), FAISS offers the highest throughput, decoding a ⅛th MP array in 100 ms on CPU and 3 ms on GPU. Such techniques can also scale to larger arrays (e.g., requiring 12 ms and 30 ms for one and four megapixel images, respectively, using a GPU.

At 1010, process 1000 can determine a depth of the scene at each imaging pixel based on the projector pixel corresponding to each imaging pixel. In some embodiments, process 1000 can use any suitable technique or combination of techniques to determine the scene depth for each pixel. For example, in some embodiments, based on the separation of the imager pixel location and the projector column location (e.g., lateral distance between the two locations), process 1000 can determine the depth of the scene point imaged by the pixel. In general, the light measured by a particular imager pixel can be modeled as a ray reflected from a point in the scene toward the imager pixel, and the projector emits a light plane from each column of the light source with the pattern of intensity varying as the patterns change. In some embodiments, after determining the corresponding column index c, the depth in the scene can be determined based on the point at which the light ray hitting the imager pixel and the light plane projected by the light source intersect in the scene.

In some embodiments, process 1000 can output the depth values (e.g., to any suitable destination). For example, the depth values can be provided to a computer-vision system. As another example, the depth values can be stored in memory. In some embodiments, process 1000 can return to 1004 and/or 1002 (e.g., to re-evaluate scene conditions).

Figure 11:
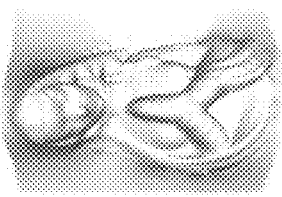
FIG. 11 shows an example of a static scene onto which a series of binary patterns was projected, depths estimated using a conventional Gray code, and depths estimated using various binary projection schemes in accordance with some embodiments of the disclosed subject matter.

FIG. 11 shows an example of a static scene onto which a series of binary patterns was projected, depths estimated using a conventional Gray code, and depths estimated using various binary projection schemes in accordance with some embodiments of the disclosed subject matter.

A range of experiments are described in connection with FIGS. 11-15, which demonstrate performance of different single-photon SL techniques. A lab prototype was constructed with a SwissSPAD2 array (e.g., as described in Ulku et al., "A 512×512 SPAD Image Sensor With Integrated Gating for Widefield FLIM," IEEE Journal of Selected Topics in Quantum Electronics, 25(1): 1-12, (2019)), which is a 512×256 SPAD array. The array has a pixel pitch of 16.38 micrometers (μm), and can capture binary frames at speeds up to 100 kHz. Additional details of the prototype, including the calibration procedure used, are described in Appendix A, which has been incorporated herein by reference.

FIG. 11 shows a performance comparison for different single-photon SL strategies on a scene including a porcelain bust. The ground truth was generated by averaging a burst of 5120 binary frames captured for each projected pattern. To illustrate the challenge of photon noise, a reconstruction using a Gray code without repetition is included, which has severe artifacts. Comparisons between different strategies, including a hybrid strategy, across operating points n={63, 255}. BCH codes having several high spatial-frequency frames, are more distorted by short-range effects. Three metrics are shown, root mean-squared error (RMSE) in estimated depth, percentage of inliers (absolute depth error <5 mm), and RMSE among the inliers.

To characterize the performance of mechanisms described herein, static scenes of varying albedo and ambient light levels were imaged using the prototype. These case studies can be used to compare the performance of different error correction schemes and to show the effectiveness of the proposed hybrid codes. To obtain ground truth scans of the objects being imaged, a DMD projector was used to project patterns at a relatively low frame-rate of 2 hertz (Hz), while operating that SPAD at 10,240 Hz, thereby obtaining 5120 SPAD frames per projected pattern. The average of 5,120 frames has minimal photon noise, and can be used as a ground truth measurement.

More particularly, FIG. 11 compares a hybrid encoding and a BCH encoding of a Gray code (the first 10 rows of FIG. 4A) to repeated Gray codes and repeated long-run Gray codes. Overall RMSE and RMSE among inliers are presented, thereby measuring both accuracy and consistency. As described above in connection with FIGS. 6A and 6B, and shown in FIG. 11, the hybrid code was considerably more consistent and accurate across the two redundancy factors used. Depths estimated using naive BCH codes, on the other hand, were distorted heavily due to defocus. For fair comparisons, each strategy has access only to a single binary frame per projected pattern. This emulates a 3D capture speed of 40 FPS in Hybrid (n=255) and 130 FPS in hybrid (n=63).

Figure 12:
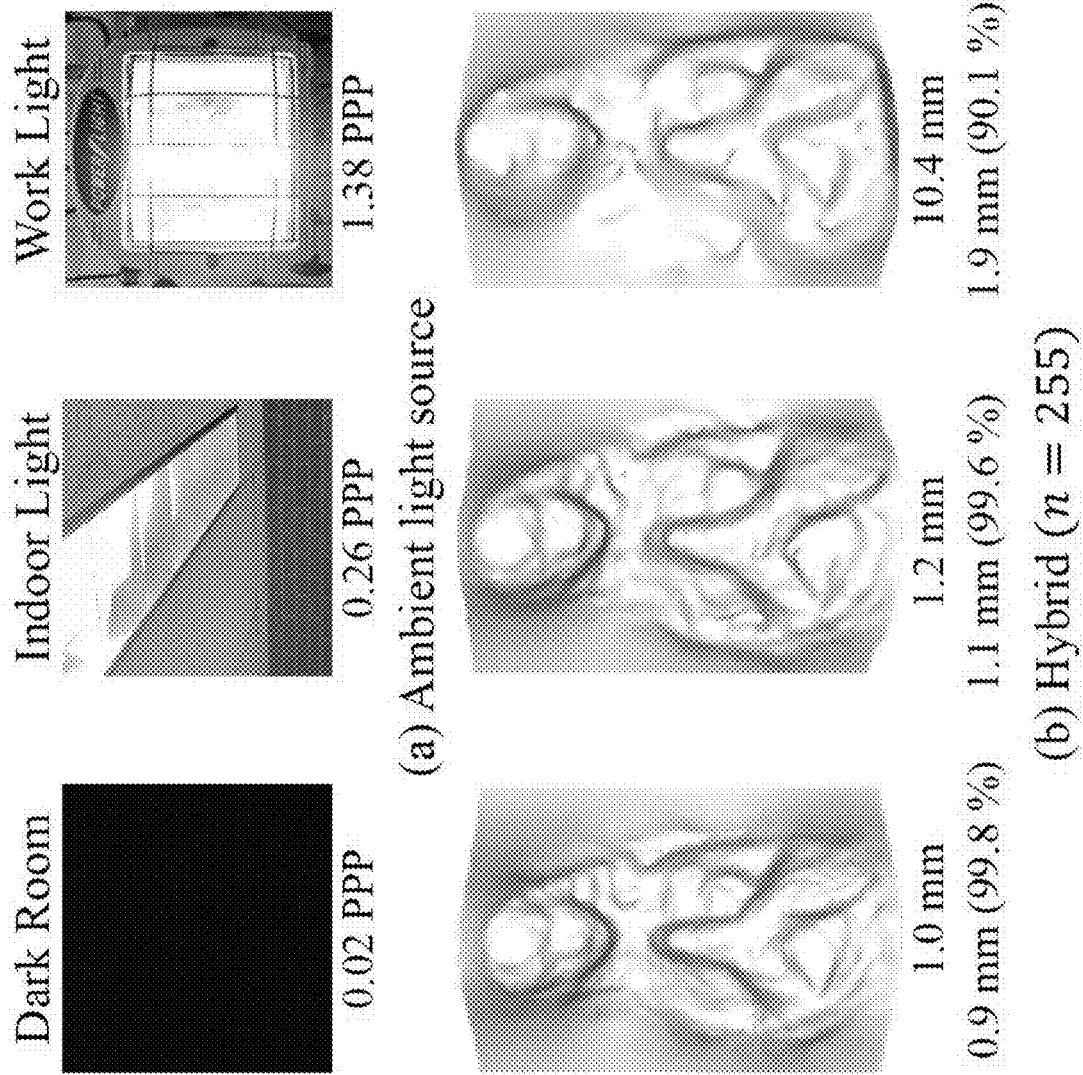
FIG. 12 shows examples various conditions, and depths estimated using a hybrid encoding scheme described herein with relatively high redundancy under the various conditions.

FIG. 12 shows examples various conditions, and depths estimated using a hybrid encoding scheme described herein with relatively high redundancy under the various conditions.

The experiment depicted in FIG. 12 explores effects of ambient light intensity on decoding accuracy. As shown in FIG. 12, panel (b), hybrid codes, shown here for n=255, are fairly robust to indoor ambient light and can recover coarse shapes even under bright ambient light. The average photons incident per pixel (PPP) during an exposure window are reported in FIG. 12, panel (a), as a measure of ambient illumination.

FIG. 12, panel (a) shows examples of various ambient light conditions (including a darkened room with no light sources, indoor lighting, and a bright work lamp aimed at the scene) for which mechanisms described herein were evaluated. As shown in FIG. 12, the different ambient light sources impacted reconstruction quality. The recovered depth-maps, shown for Hybrid (n=255), are relatively robust to ambient light, albeit with a drop in performance under the work lamp. As shown in FIG. 12, panel (b), the drop in performance generally results in a loss of detail, while maintaining the general shape of the bust (e.g., it did cause distortions that can be seen in the repeated Gray results in FIG. 11).

Figure 13:
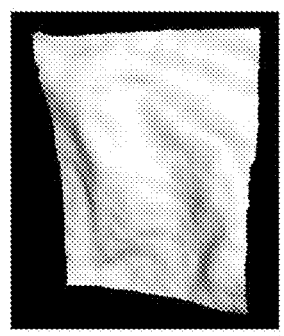
FIG. 13 shows an example of a dynamic scene including a non-rigid deforming object, a binary frame corresponding to a particular projection pattern captured using a single-photon camera, and depths in the scene at various points in time generated using mechanisms described herein with a hybrid encoding scheme with relatively low redundancy.
Figure 13:
Figure 13:
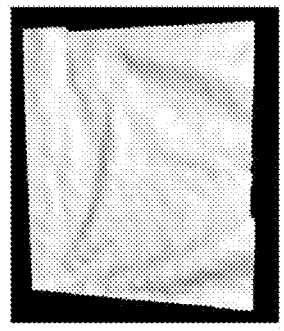

FIG. 13 shows an example of a dynamic scene including a non-rigid deforming object, a binary frame corresponding to a particular projection pattern captured using a single-photon camera, and depths in the scene at various points in time generated using mechanisms described herein with a hybrid encoding scheme with relatively low redundancy.

In FIG. 13 the non-rigid deforming object was captured using single-photon SL techniques, in particular, using a hybrid (n=63) at 250 3D FPS. FIG. 13, panel (a) shows a reference image captured by the SPAD camera using a long integration time, and panel (b) shows a single binary frame. FIG. 13, panel (c) shows reconstructed meshes that clearly show the folds of the moving cloth. Capturing a non-rigid object can be particularly challenging, unless operating at high speeds, excessive motion blur is induced. Note that the examples of static scenes (e.g., the tire of FIG. 1B, the scene in FIGS. 11 and 12), the SPADs were operated at a rate of 10,240 Hz, leading to lower overall 3D frame rates than the dynamic scenes, for which the SPADs were operated at a frame rate of 20 kHz.

The deforming folds of a cloth were reconstructed as it was waved in front of the camera. This demonstrates the ability of single-photon SL techniques described herein to recover detailed 3D geometry of high-speed deformable objects.

Figure 14:
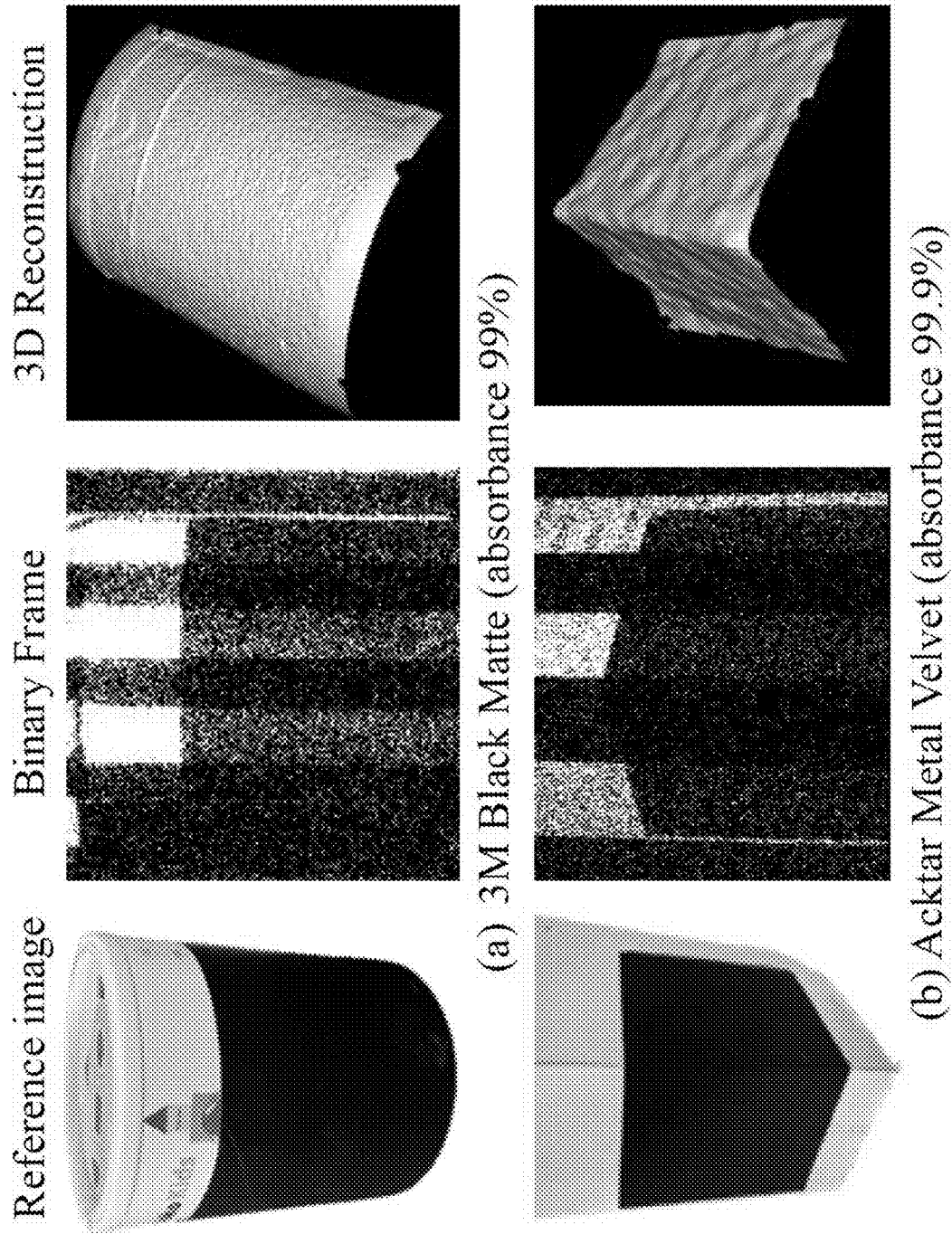
FIG. 14 shows examples of scenes that include low-albedo materials, binary frames corresponding to particular projection patterns captured using a single-photon camera, and depths in the scenes estimated in accordance with some embodiments of the disclosed subject matter with a hybrid encoding scheme with relatively high redundancy.

FIG. 14 shows examples of scenes that include low-albedo materials, binary frames corresponding to particular projection patterns captured using a single-photon camera, and depths in the scenes estimated in accordance with some embodiments of the disclosed subject matter with a hybrid encoding scheme with relatively high redundancy.

In FIG. 14, a 3D reconstruction of two low-albedo scenes is shown. In particular, panel (a) shows a white cylinder covered by 3M Black Matte material, and panel (b) shows an inverted V-groove covered by Acktar Metal Velvet. Note the absence of shading on the Acktar material in FIG. 12, panel (b). Both materials used have extremely high absorbance of 99% and 99.9%, respectively. The results shown in FIG. 14 are reconstructions using data that was obtained using a hybrid coding scheme (n=255) at 40 FPS.

As FIG. 14, single-photon SL can recover the geometry of these dark objects very accurately, even when they are not visually perceptible. FIG. 1 also shows reconstruction of tire treads scanned at 40 FPS using the same hybrid coding scheme.

Figure 15:
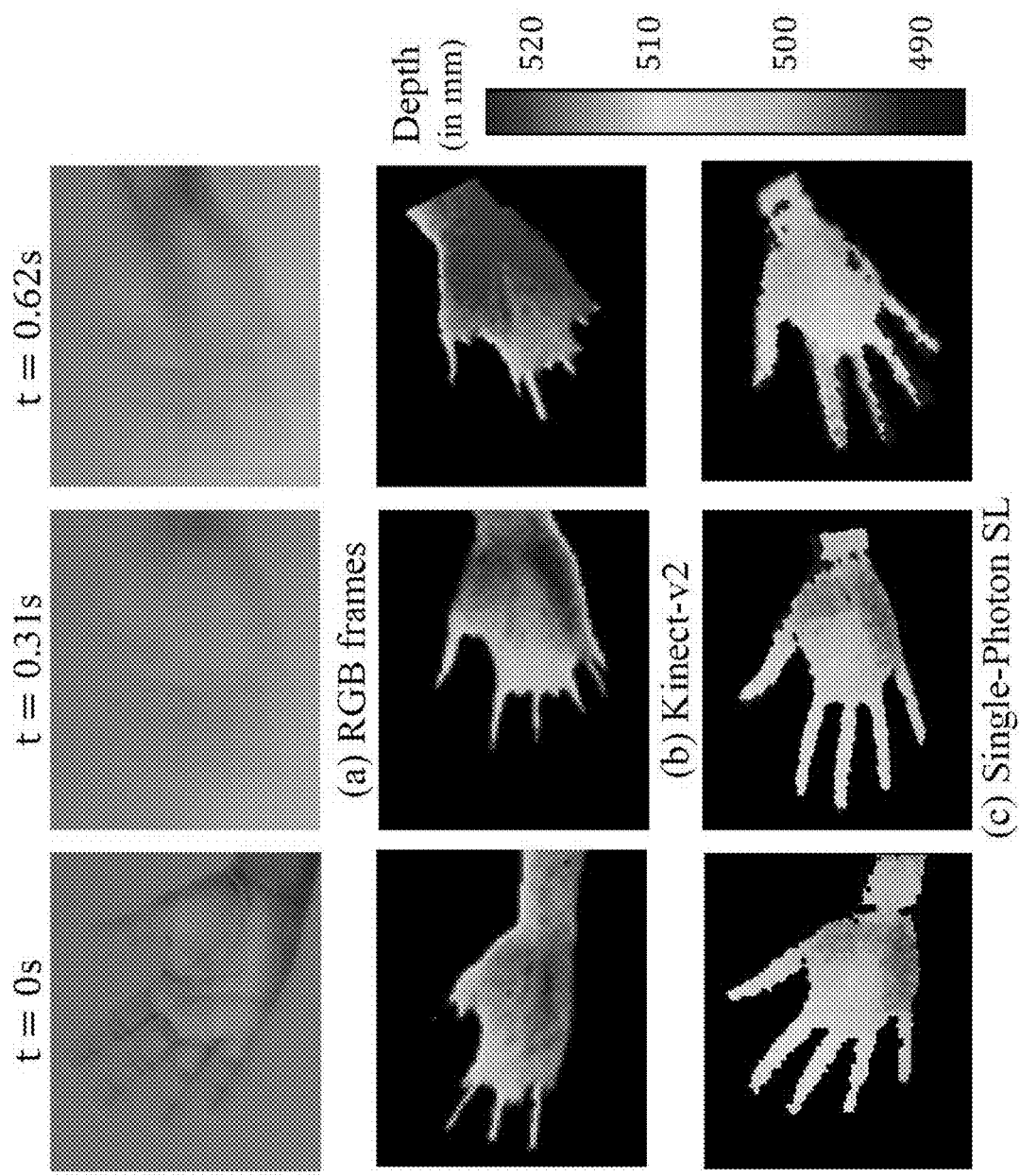
FIG. 15 shows an example of a dynamic scene at various points in time including a rapidly moving human hand, depths in the scene at various points in time generated using a conventional depth camera, and depths in the scene at various points in time generated using mechanisms described herein with a hybrid encoding scheme with relatively low redundancy.

FIG. 15 shows an example of a dynamic scene at various points in time including a rapidly moving human hand, depths in the scene at various points in time generated using a conventional depth camera, and depths in the scene at various points in time generated using mechanisms described herein with a hybrid encoding scheme with relatively low redundancy.

In FIG. 15, a comparison is shown between depth maps generated using mechanisms described herein and depth maps generated using a Kinect-v2 system (e.g., as described in Zhang, "Microsoft kinect sensor and its effect," IEEE MultiMedia, 19:4-12, (2012)). The depth maps in FIG. 15, panel (c) were generated using a hybrid code (n=63) at 250 FPS to capture these rapid movements. As shown in FIG. 15, panel (b), only the palm is visible in the Kinect's depth maps (with a very small portion of some fingers apparent). The motion blur distorted RGB frames, acquired by the Kinect at 30 FPS, convey the speed involved.

For dynamic scenes, the Vialux V7000 development kit based on the Texas Instruments DLP6500 DMD was used to project patterns. This device is capable of projecting binary images with a resolution of 1024×768 pixels at 20 kHz. For simplicity, the SPAD was operated at the same speed as the projector. The projector uses a broadband white LED (SugarCUBE Ultra White LED) as the illumination source.

FIG. 15 shows high-speed 3D imaging for a sequence of fast hand movements, with color frames captured at 30 FPS shown in FIG. 15, panel (a). As shown in FIG. 15, panel (b), a commercial 3D scanner (Kinect-v2 camera) operating at 30 FPS fails to recover the fingers of the rapidly moving hand. The results in FIG. 15, panel (c) shown that single-photon SL was able to recover fine details despite the relatively high speed motion.

Results described above in connection with FIGS. 11-15 show that on these challenging scenes—both static and dynamic—single-photon SL can achieve high speed, precision, and robustness, which can mitigate tradeoffs inherent to SL systems.

In some embodiments, single-photon SL techniques described herein can exploit the single photon detection capabilities of SPAD sensors, as well as the lack of read noise. Prototype systems implemented in accordance with some embodiments of the disclosed subject matter were capable of detecting objects with high absorbance, and scenes with dramatic high-speed motion. In some embodiments, single-photon SL can be implemented using a set of error correction codes described herein, which can provide resilience to aberrations commonly present in SL systems.

Note that the performance of single-photon SL is influenced significantly by limitations of current SPAD sensors, which include a low fill factor, spatial resolution, and pixel pitch. While SPADs are still in their nascency, SPAD technology can be expected to steadily improve, which will lead to enhanced reconstruction quality using mechanisms described herein.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

Figure 6B:
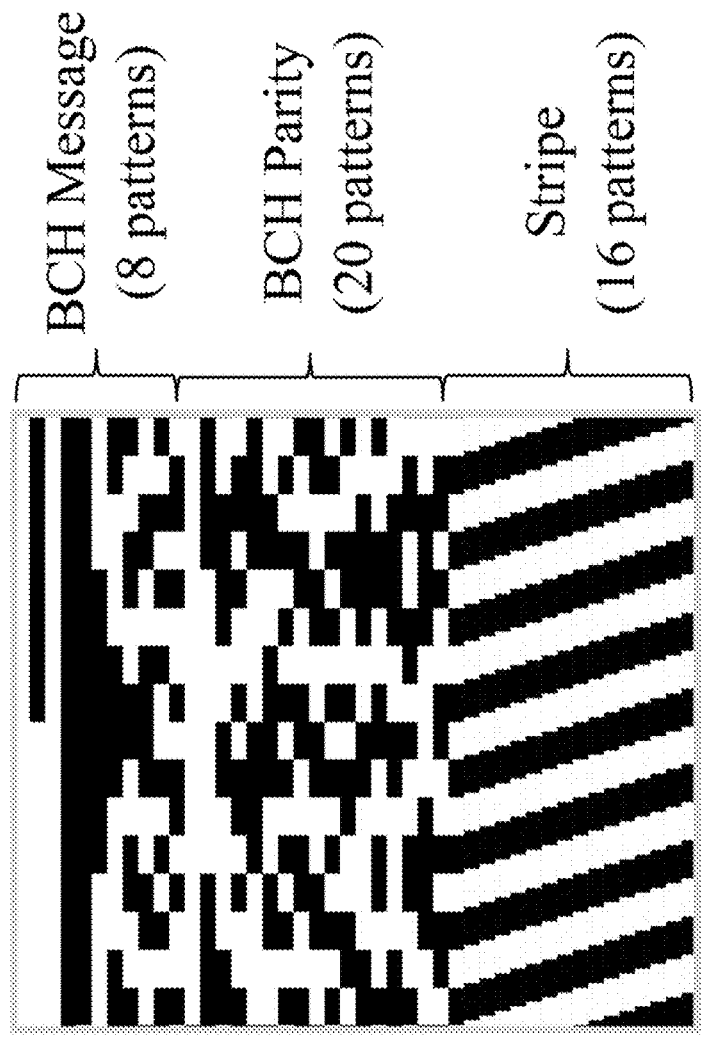

It should be understood that the above described steps of the process of FIG. 6 can be executed or performed in any suitable order or sequence not limited to the order and sequence shown and described in the figures. Also, some of the above steps of the processes of FIG. 6 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for estimating depths in a scene, the system comprising:
  a light source;
  an image sensor comprising an array including a plurality of single-photon detectors;
  at least one hardware processor that is programmed to:
    cause the light source to emit a sequence of n binary light patterns toward the scene, each of the n binary light patterns comprising at least L columns,
      wherein each of the n binary light patterns has a minimum stripe width of 8 columns; and
      wherein n>$\log_2(L)$;

cause, for each of the n binary light patterns, the image sensor to capture a binary image of the scene,
wherein the binary image comprises a binary value for each of the plurality of single-photon detectors indicative of whether a photon was detected such that each of the plurality of single-photon detectors generates a set of binary values corresponding to the sequence of n binary light patterns; and
estimate, for each of the plurality of single-photon detectors, a depth value based on the set of binary values generated by that single-photon detector.

2. The system of claim 1, wherein, for each of the at least L columns, a first subset of the n binary light patterns corresponds to at least a first portion of a unique codeword, and
wherein, for each of the at least L columns, a second subset of the n binary light patterns encodes at least the first portion of the unique codeword associated with that column, the second subset of columns including more columns than the first subset.

3. The system of claim 2, wherein the second subset of the n binary light patterns is a Bose-Chaudhuri-Hocquenghem (BCH) encoding of the first subset of the n binary light patterns.

4. The system of claim 2, wherein the first subset of the n binary light patterns comprises long Gray codes, and the second subset of the n binary light patterns comprises multiple repetitions of the long Gray codes.

5. The system of claim 2, wherein, for each of the at least L columns, a third subset of the n binary light patterns corresponds to a second portion of the unique codeword, the third subset encodes the second portion of the unique codeword in a phase of a binary stripe pattern.

6. The system of claim 1, wherein the light source comprises a digital micromirror device (DMD) comprising an array of micromirrors.

7. The system of claim 1, wherein each of the plurality of single-photon detectors comprises a single-photon avalanche diode (SPAD).

8. The system of claim 1, wherein n≥63.

9. A method for estimating depths in a scene, the method comprising:
causing a light source to emit a sequence of n binary light patterns toward the scene, each of the n binary light patterns comprising at least L columns,
wherein each of the n binary light patterns has a minimum stripe width of 8 columns; and
wherein n>log$_2$(L);
causing, for each of the n binary light patterns, an image sensor to capture a binary image of the scene,
wherein the image sensor comprises an array including a plurality of single-photon detectors, and
wherein the binary image comprises a binary value for each of the plurality of single-photon detectors indicative of whether a photon was detected such that each of the plurality of single-photon detectors generates a set of binary values corresponding to the sequence of n binary light patterns; and
estimating, for each of the plurality of single-photon detectors, a depth value based on the set of binary values generated by that single-photon detector.

10. The method of claim 9, wherein, for each of the at least L columns, a first subset of the n binary light patterns corresponds to at least a first portion of a unique codeword, and
wherein, for each of the at least L columns, a second subset of the n binary light patterns encodes at least the first portion of the unique codeword associated with that column, the second subset of columns including more columns than the first subset.

11. The method of claim 10, wherein the second subset of the n binary light patterns is a Bose-Chaudhuri-Hocquenghem (BCH) encoding of the first subset of the n binary light patterns.

12. The method of claim 10, wherein the first subset of the n binary light patterns comprises long Gray codes, and the second subset of the n binary light patterns comprises multiple repetitions of the long Gray codes.

13. The method of claim 10, wherein, for each of the at least L columns, a third subset of the n binary light patterns corresponds to a second portion of the unique codeword, the third subset encodes the second portion of the unique codeword in a phase of a binary stripe pattern.

14. The method of claim 9, wherein the light source comprises a digital micromirror device (DMD) comprising an array of micromirrors.

15. The method of claim 9, wherein each of the plurality of single-photon detectors comprises a single-photon avalanche diode (SPAD).

16. The method of claim 9, wherein n≥63.

17. A non-transitory computer readable medium containing computer executable instructions that, when executed by a processor, cause the processor to perform a method for estimating depths in a scene, the method comprising:
causing a light source to emit a sequence of n binary light patterns toward the scene, each of the n binary light patterns comprising at least L columns,
wherein each of the n binary light patterns has a minimum stripe width of 8 columns; and
wherein n>log$_2$(L);
causing, for each of the n binary light patterns, an image sensor to capture a binary image of the scene,
wherein the image sensor comprises an array including a plurality of single-photon detectors, and
wherein the binary image comprises a binary value for each of the plurality of single-photon detectors indicative of whether a photon was detected such that each of the plurality of single-photon detectors generates a set of binary values corresponding to the sequence of n binary light patterns; and
estimating, for each of the plurality of single-photon detectors, a depth value based on the set of binary values generated by that single-photon detector.

18. The non-transitory computer readable medium of claim 17, wherein, for each of the at least L columns, a first subset of the n binary light patterns corresponds to at least a first portion of a unique codeword, and
wherein, for each of the at least L columns, a second subset of the n binary light patterns encodes at least the first portion of the unique codeword associated with that column, the second subset of columns including more columns than the first subset.

19. The non-transitory computer readable medium of claim 17, wherein the light source comprises a digital micromirror device (DMD) comprising an array of micromirrors.

20. The non-transitory computer readable medium of claim 17, wherein each of the plurality of single-photon detectors comprises a single-photon avalanche diode (SPAD).

* * * * *